(12) United States Patent
Samuelsson et al.

(10) Patent No.: US 11,770,552 B2
(45) Date of Patent: *Sep. 26, 2023

(54) REFERENCE PICTURE SIGNALING

(71) Applicant: Telefonaktiebolaget LM Ericsson (publ), Stockholm (SE)

(72) Inventors: Jonatan Samuelsson, Stockholm (SE); Rickard Sjöberg, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/562,206

(22) Filed: Dec. 27, 2021

(65) Prior Publication Data

US 2022/0210468 A1  Jun. 30, 2022

Related U.S. Application Data

(63) Continuation of application No. 16/885,103, filed on May 27, 2020, now Pat. No. 11,265,576, which is a
(Continued)

(51) Int. Cl.
*H04N 19/31* (2014.01)
*H04N 19/58* (2014.01)
(Continued)

(52) U.S. Cl.
CPC .......... *H04N 19/573* (2014.11); *H04N 19/31* (2014.11); *H04N 19/433* (2014.11); *H04N 19/58* (2014.11);
(Continued)

(58) Field of Classification Search
None
See application file for complete search history.

(56) References Cited

U.S. PATENT DOCUMENTS 631,447 A  8/1899  Taft
5,155,851 A  10/1992  Krishnan
(Continued)

FOREIGN PATENT DOCUMENTS

EP  1742480 A2  1/2007
JP  2008-105389  5/2008
(Continued)

OTHER PUBLICATIONS

Borgwardt, P., "Multi-picture Buffer Semantics for Interlaced Coding", Joint Video Team (JVT) of ISO/IEC MPEG & ITU-T VCEG, 3$^{rd}$ Meeting, Fairfax, Virginia, May 6-10, 2002, 18 Pages.
(Continued)

*Primary Examiner* — Mohammad J Rahman
(74) *Attorney, Agent, or Firm* — Sage Patent Group

(57) ABSTRACT

An encoded representation of a picture of a video stream is decoded by retrieving buffer description from the encoded representation. The buffer description information is used to determine at least one picture identifier identifying a respective reference picture as decoding reference for the picture. A decoded picture buffer is updated based on the determined picture identifier. The encoded representation of the picture itself comprises the information needed by a decoder to identify the reference pictures required to decode the encoded representation.

20 Claims, 12 Drawing Sheets

Related U.S. Application Data continuation of application No. 16/440,274, filed on Jun. 13, 2019, now Pat. No. 10,708,618, which is a continuation of application No. 16/048,556, filed on Jul. 30, 2018, now Pat. No. 10,368,088, which is a continuation of application No. 15/718,374, filed on Sep. 28, 2017, now Pat. No. 10,063,882, which is a continuation of application No. 15/299,997, filed on Oct. 21, 2016, now Pat. No. 9,807,418, which is a continuation of application No. 13/508,442, filed as application No. PCT/SE2012/050439 on Apr. 26, 2012, now Pat. No. 9,706,223.

(60) Provisional application No. 61/503,019, filed on Jun. 30, 2011.

(51) Int. Cl.
  *H04N 19/70* (2014.01)
  *H04N 19/89* (2014.01)
  *H04N 19/433* (2014.01)
  *H04N 19/573* (2014.01)
  *H04L 65/61* (2022.01)
  *H04L 47/50* (2022.01)

(52) U.S. Cl.
  CPC .............. *H04N 19/70* (2014.11); *H04N 19/89* (2014.11); *H04L 47/50* (2013.01); *H04L 65/61* (2022.05)

(56) References Cited

U.S. PATENT DOCUMENTS

| | | | |
|---|---|---|---|
| 5,935,213 | A | 8/1999 | Rananand |
| 6,252,873 | B1 | 6/2001 | Vines |
| 6,374,037 | B1 | 4/2002 | Okada et al. |
| 6,789,128 | B1 | 9/2004 | Harrison |
| 7,248,261 | B1 | 7/2007 | Hakura |
| 7,391,787 | B1 | 6/2008 | McCrisky |
| 7,486,678 | B1 | 2/2009 | Devanagondi |
| 8,638,847 | B2 | 1/2014 | Wang |
| 9,609,341 | B1 | 3/2017 | Gu et al. |
| 9,706,223 | B2 | 7/2017 | Samuelsson et al. |
| 10,051,264 | B2 | 8/2018 | Wang |
| 10,542,288 | B2 | 1/2020 | Pettersson |
| 2001/0055318 | A1 | 12/2001 | Obata et al. |
| 2005/0018775 | A1 | 1/2005 | Subramanian |
| 2005/0213661 | A1 | 9/2005 | Xiang et al. |
| 2006/0256866 | A1 | 11/2006 | Ziauddin et al. |
| 2007/0019724 | A1 | 1/2007 | Tourapis et al. |
| 2007/0030903 | A1 | 2/2007 | Cote et al. |
| 2007/0030904 | A1 | 2/2007 | Winger et al. |
| 2007/0030911 | A1 | 2/2007 | Yoon |
| 2007/0081588 | A1 | 4/2007 | Raveendran et al. |
| 2007/0160305 | A1 | 7/2007 | Demos |
| 2007/0183494 | A1 | 8/2007 | Hannuksela |
| 2007/0195882 | A1 | 8/2007 | Tichelaar et al. |
| 2008/0098373 | A1 | 4/2008 | Vishwanath |
| 2008/0175326 | A1 | 7/2008 | Ohbitsu |
| 2008/0260034 | A1 | 10/2008 | Wang et al. |
| 2008/0292003 | A1* | 11/2008 | Wang ................ H04N 19/172 375/E7.027 |
| 2009/0016366 | A1 | 1/2009 | Endo |
| 2009/0238261 | A1 | 9/2009 | Bhavani et al. |
| 2009/0238269 | A1 | 9/2009 | Pandit et al. |
| 2010/0098174 | A1 | 4/2010 | Adachi et al. |
| 2010/0118944 | A1 | 5/2010 | Tanaka et al. |
| 2010/0153395 | A1* | 6/2010 | Hannuksela ..... H04N 21/85406 707/E17.089 |
| 2010/0189182 | A1 | 7/2010 | Hannuksela |
| 2010/0195721 | A1 | 8/2010 | Wu et al. |
| 2010/0208828 | A1 | 8/2010 | Lu et al. |
| 2010/0238822 | A1 | 9/2010 | Koyabu et al. |
| 2011/0080949 | A1 | 4/2011 | Takahashi et al. |
| 2011/0142130 | A1 | 6/2011 | Lin et al. |
| 2012/0036544 | A1* | 2/2012 | Chen .................. H04N 21/435 725/109 |
| 2012/0069903 | A1 | 3/2012 | Lim et al. |
| 2012/0230401 | A1 | 9/2012 | Chen et al. |
| 2014/0072038 | A1 | 3/2014 | Samuelsson |

FOREIGN PATENT DOCUMENTS

| | | |
|---|---|---|
| JP | 5616562 B2 | 10/2014 |
| RU | 2328090 C2 | 6/2008 |
| RU | 2413360 C1 | 2/2011 |
| WO | WO 2008-105389 A1 | 9/2008 |

OTHER PUBLICATIONS

Decision on Grant Corresponding to Russian Patent Application No. 2014102959/08; dated Apr. 12, 2016; Foreign Text, 9 Pages, English Translation Thereof, 7 Pages.

European Examination Report Corresponding to European Application No. 12724780.7, dated Jun. 9, 2015, 8 pages.

International Search Report and Written Opinion Corresponding to International Application No. PCT/SE2012/050439; dated Jul. 19, 2012; 13 Pages.

Japanese Office Action Corresponding to Japanese Patent Application No. 2014-185639; dated Nov. 13, 2015; Foreign Text, 3 Pages, English Translation Thereof, 3 Pages.

Japanese Office Action Corresponding to Japanese Patent Application No. 2014-185640; dated Nov. 13, 2015; Foreign Text, 3 Pages, English Translation Thereof, 3 Pages.

"JCT-VC Document Management System, screenshots relative to the meeting in Torino (Jul. 2011)", JCT-VC Committee, Jul. 22, 2011, pp. 1-2, XP55162801, Retrieved from Internet URL: http://phenix.int-evry.fr/jct/, retrieved on Jan. 16, 2015. (2 pages).

Shen, Q. et al., "Buffer Requirement Analysis and Reference Picture Marking for Temporal Scalable Video Coding", *Packet Video, IEEE*, Nov. 1, 2007, pp. 91-97.

Sjöberg R. et al., "Absolute signaling of reference pictures", Joint Collaborative Team on Video Coding of WP3 and ISO/IEC JCT1/SC29/WG11, 6th Meeting, Torino, 2011, 10 Pages.

Sjoberg et al., "Absolute signaling of reference pictures, Document JCTVC-F493, Version 8", Jul. 22, 2011, pp. 1-15, XP055193064, Retrieved from Internet URL: http://phenix.int-evry.fr/jct/, retrieved on Jan. 16, 2015. (15 pages).

Sjoberg et al., "Attachment to JCTVC-F493 (Absolute Signaling of Reference Pictures), Version 8: Proposed changes to the HEVC Working Draft", Jul. 22, 2011, pp. 1-28, XP055193072, Retrieved from Internet URL: http://phenix.int-evry.fr/jct/, retrieved on Jan. 16, 2015. (28 pages).

Letter reporting Office Action in corresponding Japanese Patent Application No. 2015-141592; dated Mar. 27, 2017; Reporting Letter 2 Pages, Japanese Office Action 2 Pages.

Search Report IP.com.

Search report Google.

Wiegand et al.; "WD3: Working Draft 3 of High Efficiency Video Coding", JCTVC-E603, Joint Collaborative Team on Video Coding (JCT-VC) of ITU-T SG16 WP3 and ISO/IEC JTC1 /SC29/WG11, 5th Meeting: Geneva, CH, Mar. 16-23, 2011, 205 pages.

Chen et al., "Sliding Window for Temporal Scalability", Joint Collaborative Team on Video Coding (JCT-VC) of ITU-T SG16 WP3 and ISO/IEC JTC1/SC29/WG11, 5th Meeting: Geneva, CH, Mar. 16-23, 2011, 2 pages.

Indian Examination Report for Indian Application No. 201848047358 dated May 7, 2021, 5 pages.

Russian Search Report for Russian Application No. 2019137954/07 dated Nov. 28, 2021, 2 pages.

Intellectual Property Corporation of Malaysia Search Report for Application No. PI 2018000860, dated Jun. 2, 2022, 3 Pages.

\* cited by examiner

POC:           0   1   2   3   4   5   6
FRAME_NUM:     0   1   2   3   4   5   6
TEMPORAL_ID:   0   1   0   1   0   1   0

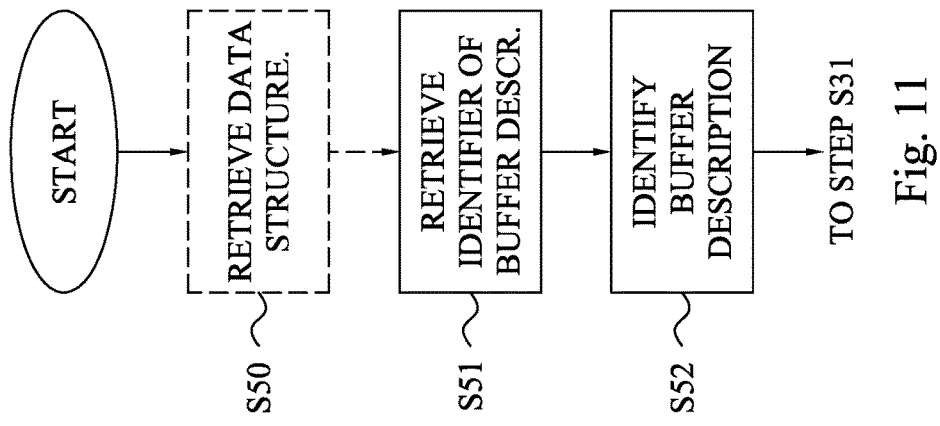
Fig. 11
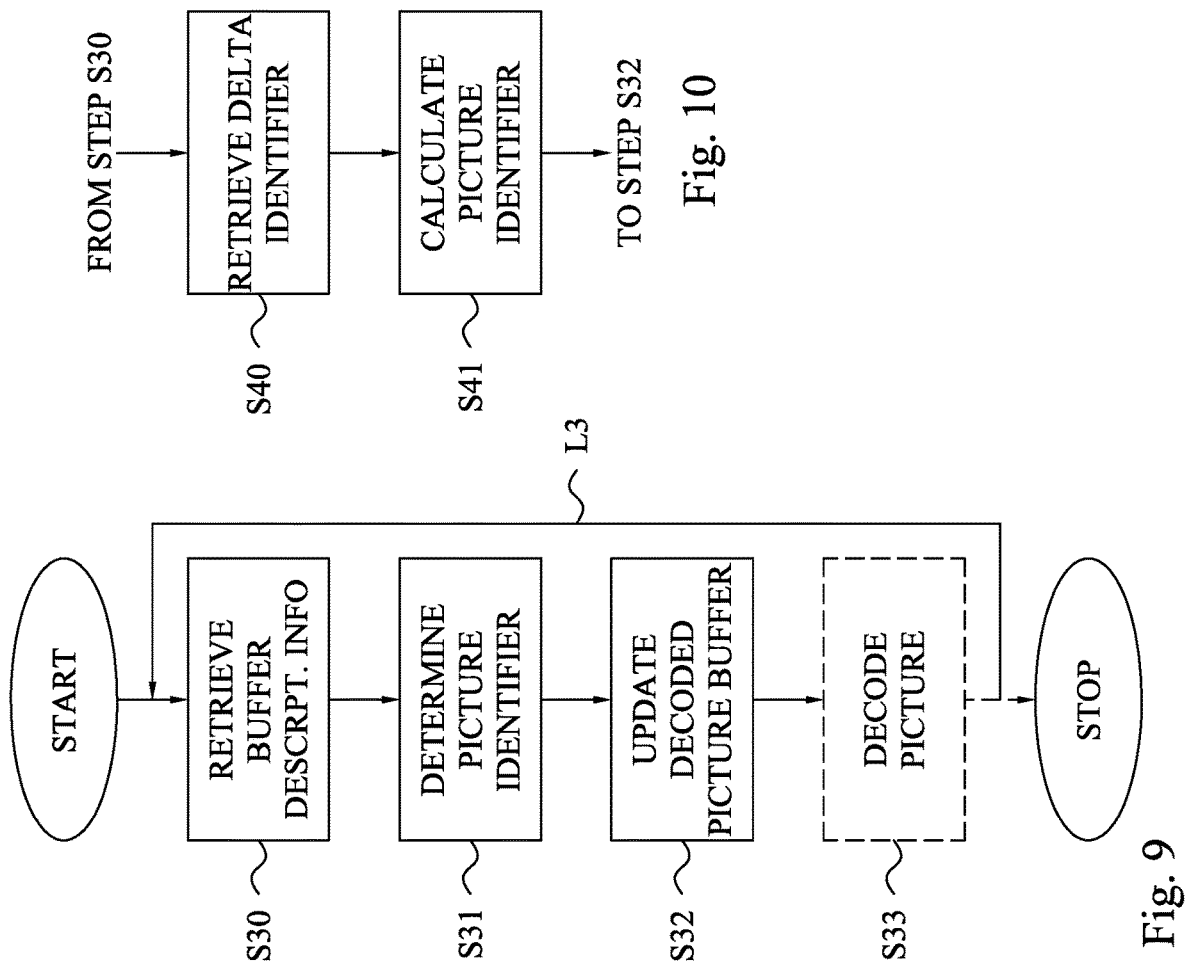
Fig. 10
Fig. 9

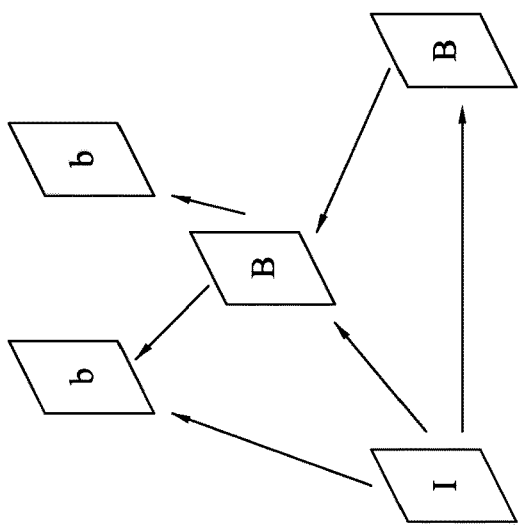
POC: 0 1 2 3 4
DECODING ORDER: 0 3 2 4 1
ADDITIONAL_PICTURE_ID: 0 0 0 0 0
Fig. 15
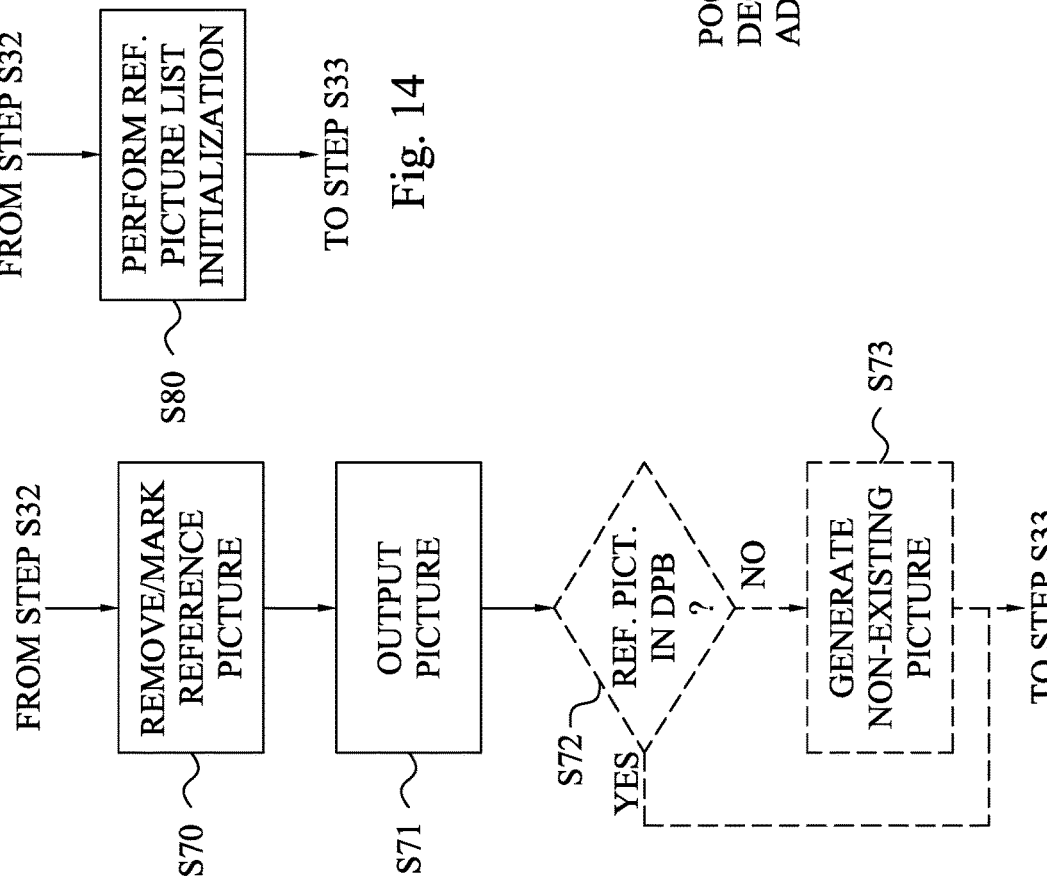
Fig. 14
Fig. 13

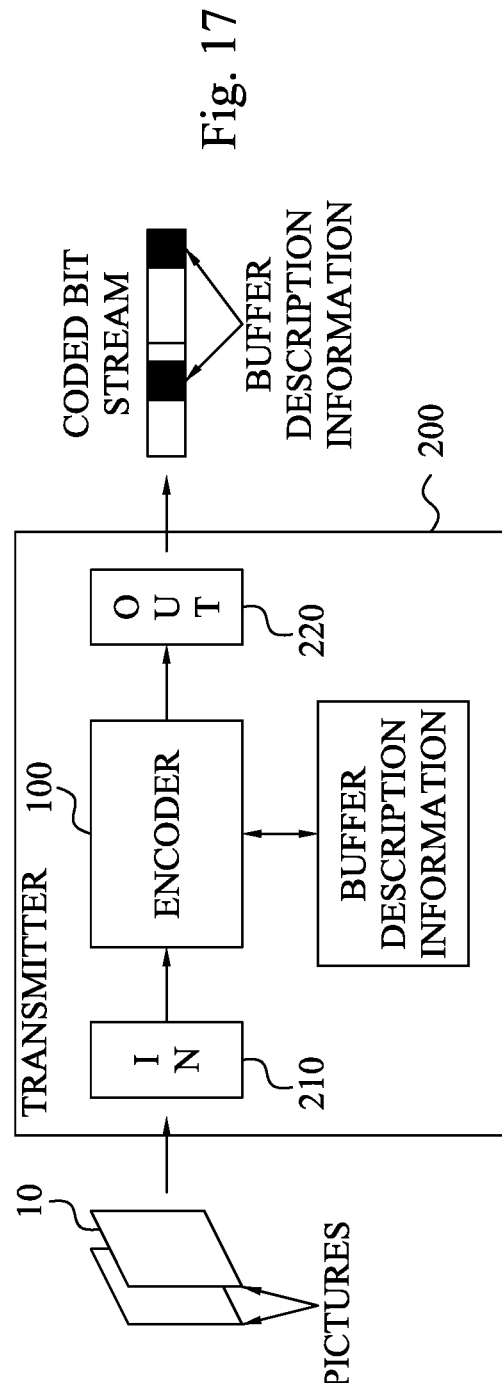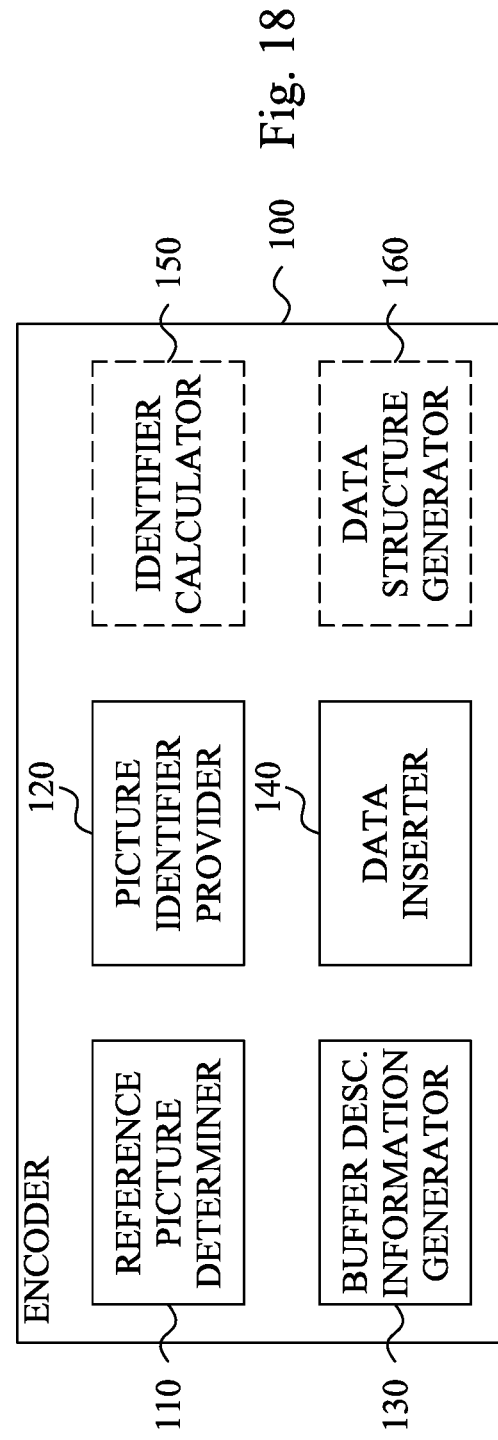

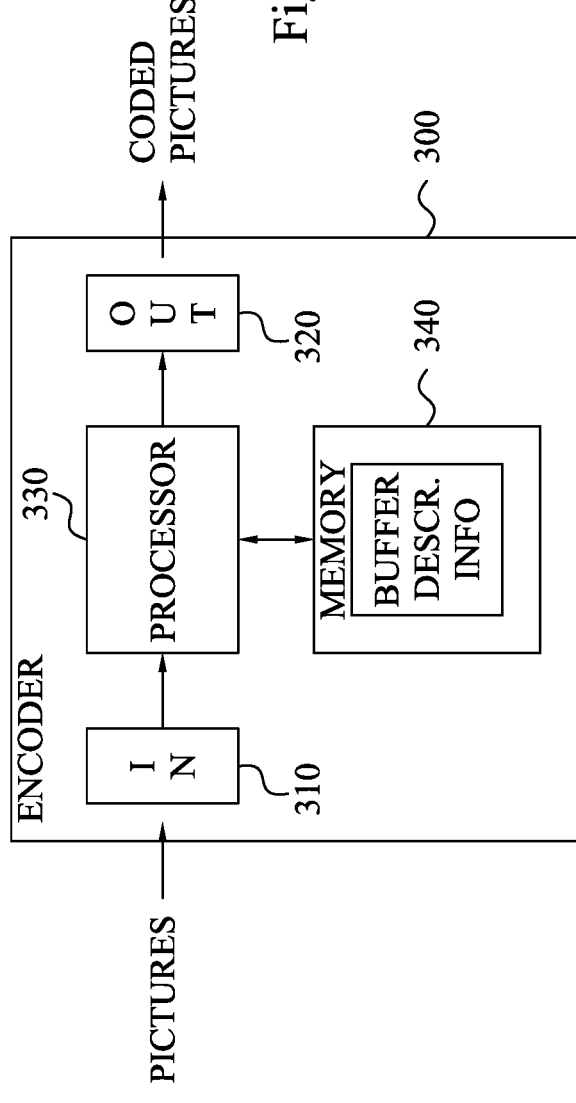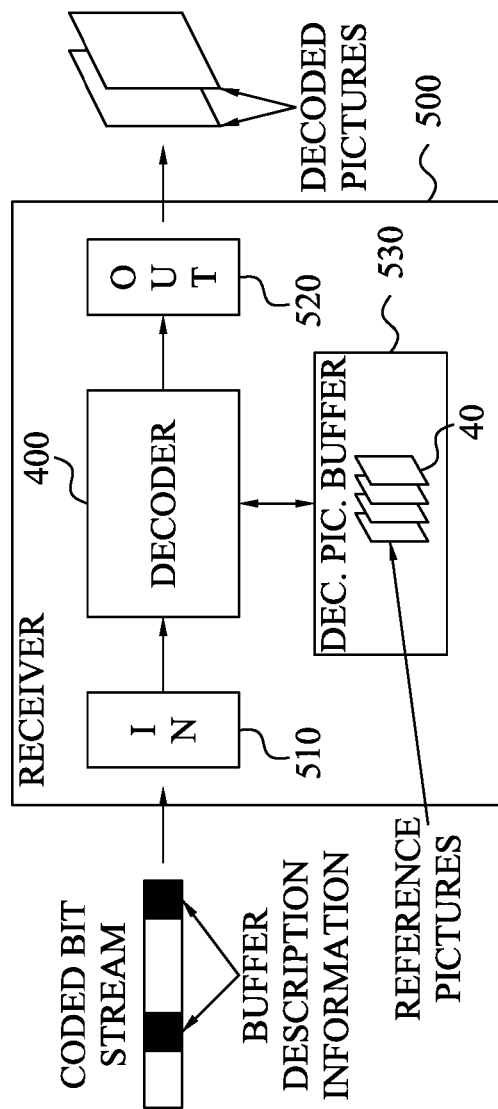

REFERENCE PICTURE SIGNALING

CROSS-REFERENCE TO RELATED APPLICATIONS

This application is a continuation of U.S. patent application Ser. No. 16/885,103, filed on May 27, 2020, which is a continuation of U.S. patent application Ser. No. 16/440,274, filed on Jun. 13, 2019, now U.S. Pat. No. 10,708,618, which is a continuation of U.S. patent application Ser. No. 16/048,556, filed on Jul. 30, 2018, now U.S. Pat. No. 10,368,088 which is a continuation of U.S. patent application Ser. No. 15/718,374, filed on Sep. 28, 2017, now U.S. Pat. No. 10,063,882, which is a continuation of U.S. patent application Ser. No. 15/299,997, filed on Oct. 21, 2016, now U.S. Pat. No. 9,807,418, which is a continuation of U.S. patent application Ser. No. 13/508,442, filed on Apr. 25, 2013, now U.S. Pat. No. 9,706,223, which is a 35 U.S.C. § 371 national stage application of PCT International Application No. PCT/SE2012/050439, filed on Apr. 26, 2012, which claims the benefit of priority from U.S. Provisional Application No. 61/503,019, filed Jun. 30, 2011, the entire contents of each of which are incorporated by reference herein as if set forth in their entireties.

TECHNICAL FIELD

The embodiments generally relate to reference picture management in connection with video encoding and decoding, and in particular to reference picture signaling and buffer management.

BACKGROUND

H.264, also referred to as Moving Picture Experts Group-4 (MPEG-4) Advanced Video Coding (AVC), is the state of the art video coding standard. It consists of a block based hybrid video coding scheme that exploits temporal and spatial prediction.

High Efficiency Video Coding (HEVC) is a new video coding standard currently being developed in Joint Collaborative Team-Video Coding (JCT-VC). JCT-VC is a collaborative project between MPEG and International Telecommunication Union Telecommunication standardization sector (ITU-T). Currently, a Working Draft (WD) is defined that includes large macroblocks (abbreviated LCUs for Largest Coding Units) and a number of other new tools and is considerably more efficient than H.264/AVC.

At a receiver a decoder receives a bit stream representing pictures, i.e. video data packets of compressed data. The compressed data comprises payload and control information. The control information comprises e.g. information of which reference pictures should be stored in a reference picture buffer, also referred to as a decoded picture buffer (DPB). This information is a relative reference to previous received pictures. Further, the decoder decodes the received bit stream and displays the decoded picture. In addition, the decoded pictures are stored in the decoded picture buffer according to the control information. These stored reference pictures are used by the decoder when decoding subsequent pictures.

A working assumption for the processes of decoded picture buffer operations in the working draft of HEVC is that they will be inherited from H.264/AVC to a very large extent. A simplified flow chart of the scheme as it is designed in H.264/AVC is shown in FIG. 1.

Before the actual decoding of a picture, the frame_num in the slice header is parsed to detect a possible gap in frame_num if Sequence Parameter Set (SPS) syntax element gaps_in_frame_num_value_allowed_flag is 1. The frame_num indicates the decoding order. If a gap in frame_num is detected, "non-existing" frames are created and inserted into the decoded picture buffer (DPB).

Regardless of whether there was a gap in frame_num or not the next step is the actual decoding of the current picture. If the slice headers of the picture contain Memory Management Control Operations (MMCO) commands, adaptive memory control process is applied after decoding of the picture to obtain relative reference to the pictures to be stored in the decoded picture buffer; otherwise a sliding window process is applied to obtain relative reference to the pictures to be stored in the decoded picture buffer. As a final step, the "bumping" process is applied to deliver the pictures in correct order.

A problem with H.264/AVC is its vulnerability to losses of pictures that contains MMCO of type 2, 3, 4, 5 or 6 as described in Table 1 below.

TABLE 1

Memory management control operation values for H.264/AVC

| memory_management_control_operation | Memory Management Control Operation |
|---|---|
| 0 | End memory_management_control_operation syntax element loop |
| 1 | Mark a short-term reference picture as "unused for reference" |
| 2 | Mark a long-term reference picture as "unused for reference" |
| 3 | Mark a short-term reference picture as "used for long-term reference" and assign a long-term frame index to it |
| 4 | Specify the maximum long-term frame index and mark all long-term reference pictures having long-term frame indices greater than the maximum value as "unused for reference" |
| 5 | Mark all reference pictures as "unused for reference" and set the MaxLongTermFrameIdx variable to "no long-term frame indices" |

TABLE 1-continued

Memory management control operation values for H.264/AVC

| memory_management_control_operation | Memory Management Control Operation |
|---|---|
| 6 | Mark the current picture as "used for long-term reference" and assign a long-term frame index to it |

Loss of a picture that does not contain MMCO, or a picture that contains MMCO of type 0 or 1, is of course severe to the decoding process. Pixel values of the lost picture will not be available and may affect future pictures for a long period of time due to incorrect inter prediction. There is also a risk that reference picture lists for a few pictures following the lost picture will be wrong, for example if the lost picture contained MMCO that marked one short-term reference picture as "unused for reference" that otherwise would have been included in the reference picture list of the following picture. However, the decoding process can generally recover such a loss through usage of constrained intra blocks, intra slices or by other means.

But if a picture containing MMCO of type 2, 3, 4, 5 or 6 is lost there is a risk that the number of long term pictures in the DPB is different from what it would have been if the picture was received, resulting in an "incorrect" sliding window process for all the following pictures. That is, the encoder and decoder will contain a different number of short-term pictures resulting in out-of-sync behavior of the sliding window process. This loss cannot be recovered through usage of constrained intra blocks, intra slices or similar techniques (not even an open Group Of Picture (GOP) Intra picture). The only way to ensure recovery from such a loss is through an Instantaneous Decoder Refresh (IDR) picture or through an MMCO that cancels the effect of the lost MMCO. What makes the situation even worse is that a decoder will not necessarily know that the sliding window process is out-of-sync and thus cannot report the problem to the encoder or request an IDR picture even in applications where a feedback channel is available.

One way to reduce the risk of loosing important MMCO information is to use dec_ref_pic_marking_repetition Supplementary Enhancement Information (SEI) messages. However the encoder will not know if the decoder is capable of making use of dec_ref_pic_marking_repetition SEI messages. Further, there is a risk that the dec_ref_pic_marking_repetition SEI message is also lost.

There is, thus, a need for an efficient reference picture signaling and buffer management that do not suffer from the shortcomings and limitations of prior art solutions.

SUMMARY

It is a general objective to provide an efficient reference picture signaling and buffer management in connection with video encoding and decoding.

This and other objectives are met by embodiments disclosed herein.

An aspect of the embodiments relates to a method of decoding an encoded representation of a picture of a video stream of multiple pictures. The method comprises retrieving buffer description information defining at least one reference picture from the encoded representation of the picture. At least one picture identifier identifying a respective reference picture of the at least one reference picture is determined based on the buffer description information. The respective reference picture is to be used as decoding reference for the picture. A decoded picture buffer is updated based on the determined at least one picture identifier.

A related aspect of the embodiments defines a decoder configured to decode an encoded representation of a picture of a video stream of multiple pictures. The decoder comprises a data retriever configured to retrieve buffer description information defining at least one reference picture from the encoded representation of the picture. A picture identifier determiner of the decoder is configured to determine, based on the buffer description information, at least one picture identifier identifying a respective reference picture of the at least one reference picture as decoding reference for the picture. The decoder also comprises a buffer manager configured to update a decoded picture buffer based on the at least one picture identifier.

Another related aspect of the embodiments defines a decoder comprising an input section configured to receive encoded representations of multiple pictures of a video stream. The decoder also comprises a processor configured to process code means of a computer program stored in a memory. The code means causes, when run on the processor, the processor to retrieve buffer description information defining at least one reference picture from an encoded representation of a picture. The processor is also caused to determine, based on the buffer description information, at least one picture identifier identifying a respective reference picture of the at least one reference picture as decoding reference for the picture. The code means further causes the processor to update a decoded picture buffer based on the at least one picture identifier. An output section of the decoder is configured to output decoded pictures of the video stream.

Another aspect of the embodiments relates to a method of encoding a picture of a video stream of multiple pictures. The method comprises determining, for the picture, at least one reference picture of the multiple pictures as encoding reference for the picture. The method also comprises providing, for each reference picture, a picture identifier identifying the reference picture. Buffer description information defining the at least one reference picture is generated based on the at least one picture identifier. The buffer description information is inserted in an encoded representation of the picture.

A related aspect of the embodiments defines an encoder configured to encode a picture of a video stream of multiple pictures. The encoder comprises a reference picture determiner configured to determine, for the picture, at least one reference picture of the video stream as encoding reference for the picture. The encoder also comprises a picture identifier provider configured to provide, for each reference picture, a picture identifier identifying the reference picture. A buffer description information generator is configured to generate buffer description information based on the at least one reference picture identifier. The buffer description information is inserted by a data inserter in an encoded representation of the picture.

Another related aspect of the embodiments defines an encoder comprising an input section configured to receive multiple pictures of a video stream and a processor configured to process code means of a computer program stored in a memory. The code means causes, when run on the processor, the processor to determine, for a picture of the video stream, at least one reference picture of the video stream as encoding reference for the picture. The processor is also caused to provide, for each reference picture, a picture identifier identifying the reference picture and generate buffer description information based on the at least one picture identifier. The code means further causes the processor to insert the buffer description information in an encoded representation of the picture. The encoder further comprises an output section configured to output encoded representations of pictures.

In clear contrast to the prior art solutions in which correct reference picture management is dependent on that previously encoded pictures have been correctly received and decoded, the embodiments provide buffer description information that is used for reference pictures in an absolute and explicit way instead of a relative or implicit way. Thus, the encoded representation of a picture contains the information about which reference pictures to use for reference during decoding independent of the encoded representations of previous pictures in the video stream.

The embodiments thereby make reference picture management and signaling less vulnerable to errors since the decoder will only have to rely on information contained in the current picture for the reference picture management of the current picture instead of relying on correctly delivered and interpreted buffer operations in previous pictures.

BRIEF DESCRIPTION OF THE DRAWINGS

The invention, together with further objects and advantages thereof, may best be understood by making reference to the following description taken together with the accompanying drawings, in which:

FIG. 9 is a flow chart of a method of decoding an encoded representation of a picture according to an embodiment;

FIG. 10 is a flow chart of an embodiment of determining picture identifier in FIG. 9;

FIG. 11 is a flow chart of an embodiment of retrieving buffer description information in FIG. 9;

FIG. 13 is a flow chart of additional, optional step of the method in FIG. 9;

FIG. 14 is a flow chart of an additional, optional step of the method in FIG. 9;

FIG. 15 is an example of a coding structure;

FIG. 17 is a schematic block diagram of a transmitter according to an embodiment;

FIG. 18 is a schematic block diagram of an encoder according to an embodiment;

FIG. 19 is a schematic block diagram of an encoder according to another embodiment;

FIG. 20 is a schematic block diagram of a receiver according to an embodiment;

DETAILED DESCRIPTION

Figure 1:
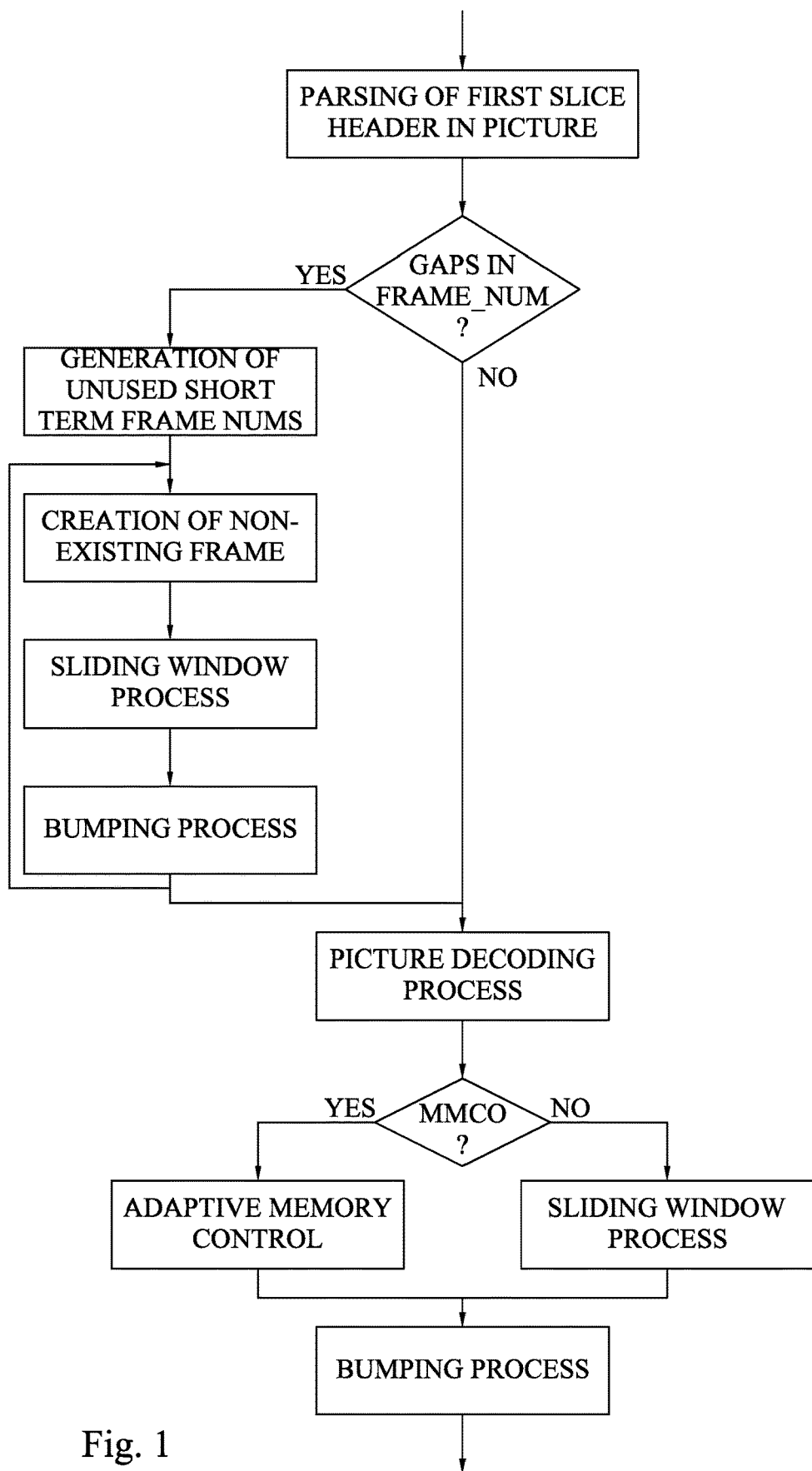
FIG. 1 is a simplified flow chart of the H.264/AVC reference buffer scheme.

Throughout the drawings, the same reference numbers are used for similar or corresponding elements.

The present embodiments generally relate to encoding and decoding of pictures, also referred to as frames in the art, of a video stream. In particular, the embodiments relate to management of reference pictures in connection with video encoding and decoding and the signaling of such reference pictures from the encoder to the decoder.

Video encoding, such as represented by H.264/MPEG-4 AVC and HEVC, utilizes reference pictures as predictions or references for the encoding and decoding of pixel data of a current picture. This is generally referred to as inter coding in the art where a picture is encoded and decoded relative to such reference pictures. In order to be able to decode an encoded picture, the decoder thereby has to know which reference pictures to use for the current encoded picture and has to have access to these reference pictures. Generally, the decoder uses a decoded picture buffer (DPB), also denoted reference picture buffer herein, for storing the reference pictures. It is then important that the reference pictures stored in the decoded picture buffer are indeed the correct reference pictures when decoding an encoded picture otherwise the decoder will use wrong reference pictures during the decoding process causing a degradation of the quality of the presented video.

The prior art techniques may suffer from problems with regard to using incorrect reference pictures when a picture carrying MMCO information is unintentionally lost, which was discussed in the background section. This problem of the prior art can be illustrated by the following H.264-implemented example. Assume that the decoded picture buffer stores three short term pictures with picture identifiers 300, 302 and 303 and two long term pictures with picture identifiers 0 and 3. The encoder might then generate a new encoded picture with a MMCO type 2 command stating that the long term picture 0 should be unused for reference. If this encoded picture would have been correctly received at the decoder the long term picture 0 would have been marked as unused for reference and the reference picture list would have been {300, 302, 303, 3}. However, if the encoded picture with the MMCO type 2 command is lost, the decoder is not informed that the long term picture 0 should be marked as unused for reference and the reference picture list is therefore instead {300, 302, 303, 0, 3}. If a next encoded picture received at the decoder comprises information that reference picture at position 3 in the reference picture list is to be used as prediction for a macroblock in the picture there will be a problem if the MMCO type 2 command is lost. If the MMCO type 2 command had been correctly received at the decoder, the reference picture at position 3 in the reference picture list would correspond to the long term picture 3 as this reference picture occupies position 3 (if starting with 0) in the reference picture list. However, with a lost MMCO type 2 command position 3 in the reference picture list is instead occupied by the long term picture 0. This means that pixel data from the long term picture 0 will be used as prediction basis instead of the correct pixel data from the long term picture identifier 3.

Thus, the prior art solution has a problem that correct reference picture management is dependent on that previously decoded pictures have been correctly received and decoded.

The present embodiments do not have these problems of the prior art techniques by using a fundamentally different approach for signaling reference pictures as compared to the prior art. The present embodiments instead specify which decoded pictures to be used for reference pictures in an absolute or explicit way instead of a relative or implicit way. Another way to put it is that the encoded representation, i.e. the bitstream, for a current picture contains the information about what pictures to use for reference, i.e. reference pictures, independent of the encoded representations of previous pictures. It can therefore be said that the logical responsibility for maintaining correct decoded picture buffer is moved from the decoder to the bitstream. One way to look at it is to say that the information about what reference pictures to use for inter prediction and motion vector prediction for a picture is included in the control information of the picture. Hence, the state of the decoded picture buffer is signaled for every picture that is encoded and decoded relative to other pictures.

According to an aspect of the embodiments a method is provided that creates buffer description information, e.g. a data structure, such as a general table with absolute information of which pictures to be used for reference pictures, i.e. stored in a decoded picture buffer (also referred to as a reference picture buffer) to be used for subsequent coding. At least a part of the buffer description information is inserted in the bitstream encoded by an encoder.

Figure 3:
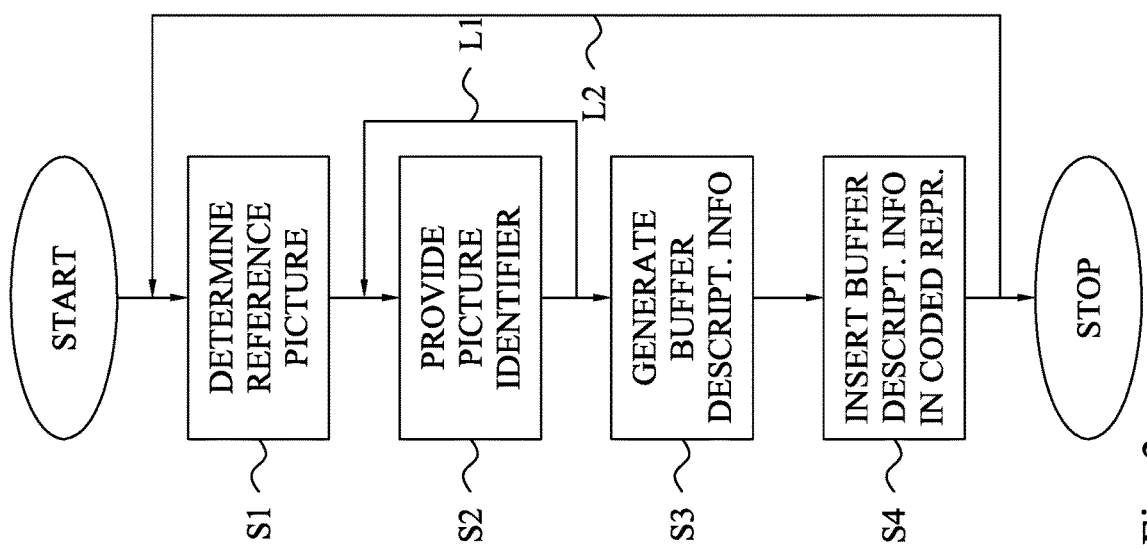
FIG. 3 is a flow chart of a method of encoding a picture according to an embodiment.

FIG. 3 is a flow chart of a method of encoding a picture according to an embodiment. The method generally starts in step S1 where at least one reference picture of a video stream of multiple pictures is determined as encoding reference. In an embodiment, step S1 determines one or more reference pictures that are used as encoding reference for a current picture to be encoded. Hence, the pixel data of the current picture is then encoded with reference to the one or more reference pictures. Alternatively, or in addition, at least one reference picture determined in step S1 could be used as encoding reference for a subsequent picture of the video stream, i.e. a picture to be encoded and decoded after the current picture. This subsequent picture is thereby after the current picture according to a decoding order (and encoding order). In a particular embodiment S1 determines, for the current picture, any reference picture of the video stream as encoding reference for the current picture and any reference picture of the video stream as encoding reference for the subsequent picture. Hence, in a particular embodiment step S1 determines all reference pictures that are prior to the current picture in decoding order and that may be used for inter prediction for the current picture or any picture following the current picture according to the decoding order.

Figure 4:
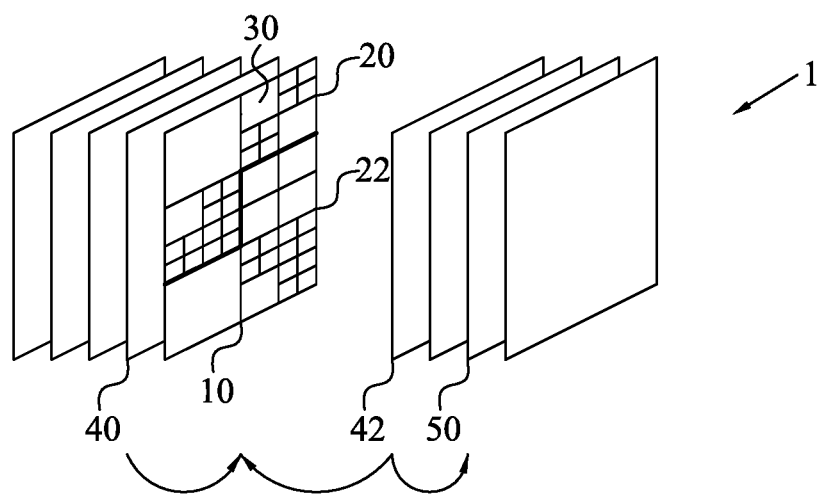
FIG. 4 is a video stream of multiple pictures according to an embodiment.

FIG. 4 schematically illustrates this concept by showing a video stream 1 of multiple pictures 10, 40, 42, 50. A current picture 10 may comprise one or more slices 20, 22 comprising pixel blocks 30, such as macroblocks, also referred to as treeblocks, or coding units, to be decoded. The arrows below the pictures 10, 40, 42, 50 indicate the decoding relationship. The current picture 10 is decoded in relation to a previous reference picture 40 and a subsequent reference picture 42. The preceding reference picture 40 is preceding and the subsequent reference picture 42 is subsequent with regard to the current picture 10 according to the output order but both are preceding the current picture 10 according to the decoding order. This subsequent reference picture 42 is furthermore used as reference picture for a subsequent picture 50 in the video stream 1. Hence, in a particular embodiment step S1 could determine reference pictures as pictures 40, 42 in FIG. 4.

A next step S2 of FIG. 3 provides a respective picture identifier for each reference picture of the at least one reference picture determined in step S1. The picture identifier is used, possibly together with other data, to unambiguously identify a reference picture. Hence, the picture identifier can be regarded as an absolute reference to pictures to be used as reference pictures. This means that it is possible to correctly identify the relevant reference picture given its picture identifier and optionally the other data.

There are various alternatives available that could be used as picture identifier according to the embodiments. For instance, the picture identifier could be the decoding order number, the display order number, the output order number or a combination of display order number and an additional identifier or indeed any other information that can be used to unambiguously identify the picture.

Examples of such picture identifiers include Picture Order Count (POC), frame number (frame_num) or POC and an additional identifier (additional_picture_id).

In a particular embodiment, the actual value of the picture identifier is used together with additional information or other data, such as the position of the picture identifier in buffer description information that is generated in step S3 to unambiguously identify the relevant reference picture. Hence, the buffer description identified or obtained by the buffer description information enables an unambiguously identification of the relevant reference picture(s). In an embodiment, the picture identifier itself, such as POC or POC plus an additional identifier, can be used to unambiguously identify the reference picture.

Unambiguously identify a reference picture is used herein to denote that the picture identifier itself or the picture identifier together with other information in the buffer description information, such as the order at which the buffer description information defines the picture identifiers, is used to explicitly identify a reference picture. Hence, given the picture identifier or the picture identifier and the other information enables identification of the relevant reference picture among the pictures of the video stream.

In a particular embodiment of step S1, the total number of reference pictures determined for the current picture could be restricted by a parameter that can be signaled from the encoder to the decoder, such as a parameter denoted max_num_ref_frames.

Step S2 is preferably performed for each reference picture determined in step S1, which is schematically illustrated by the line L1.

The picture identifier(s) provided in step S2 could be read from header portions of the reference picture(s) determined in step S1 or otherwise retrieved from the data representing the reference picture(s) from step S1.

The next step S3 generates information of a buffer description, also referred to as Reference Picture Set (RPS). This information is denoted buffer description information herein. The buffer description information is generated based on the picture identifier(s) provided in step S2. This buffer description information defines, preferably unambiguously defines, the at least one reference picture determined in step S1. Hence, it is possible to derive the respective picture identifier of the at least one reference picture from the buffer description information.

The generated buffer description information is inserted in step S4 in an encoded representation of the current picture. Hence, the encoded picture therefore carries the buffer description information that can be used at the decoder to define and identify the reference pictures that are needed to decode the current picture and/or any subsequent picture of the video stream.

The buffer description information is therefore provided in control information of the encoded picture provided from the encoder to a decoder. At a minimum, the buffer description information contains information needed by the decoder to identify the reference pictures to be used in the decoded picture buffer.

The buffer description information can therefore be regarded as information identifying a buffer description that is a set of reference pictures associated with a current picture. It consists of all reference pictures that are prior to the current picture in decoding order and that may be used for inter prediction of the current picture or any picture following the current picture in decoding order.

In an embodiment, the buffer description information contains or defines information about each picture that is used by the decoder in the decoding process even if the picture is not used for inter prediction or motion vector prediction or any other prediction. Such information could include, but is not limited to, decoding order, display order, temporally layer information and view information.

As mentioned above, the number of reference pictures that can be signaled by the buffer description information could be restricted by the parameter max_num_ref_frames. However, the buffer description information may define fewer than this maximum number of pictures, in which case the remaining ones are interpreted as "empty".

The method of FIG. 3 with steps S1 to S4 is preferably performed for each picture in the video stream except any Instantaneous Decoder Refresh (IDR) picture that cause a decoded picture buffer refresh and thereby does not need any buffer description information, which is schematically illustrated by the line L2. Hence, each encoded representation generated by the encoder preferably carries buffer description information defining the reference pictures used for encoding and decoding the current picture and/or any subsequent picture in the video stream.

This approach of the embodiments provides a significant advantage over the relative reference picture signaling of the prior art using MMCO command. The explicit signaling of reference pictures through the buffer description information in each encoded representation of the pictures in the video stream makes reference picture management less vulnerable to errors and increases the error robustness level of the decoder. Thus, instead of relying on correctly delivered and interpreted buffer operations in previous pictures, the decoder will only have to rely on information contained in the encoded representation of the current picture.

In a particular embodiment, the buffer description information inserted in the encoded representation of the picture in step S4 is in fact the buffer description itself. Thus, the buffer description information then comprises a listing of the picture identifier(s) provided in step S2 or data allowing calculation of the picture identifier(s) provided in step S2. This latter case will be further described below in connection with FIG. 6.

For instance, the buffer description could define a list with picture identifiers 3, 5 and 6 as the reference pictures for a current picture. The buffer description information inserted in the encoded representation in step S4 would then include these picture identifiers 3, 5 and 6.

An alternative approach that is generally more bit efficient, i.e. generally requires fewer number of bits or symbols for defining the picture identifiers, is to signal the reference picture properties, i.e. picture identifiers, relative to the value of these properties as signaled for the current picture. For instance, if the current picture has a picture identifier 7 the list of reference pictures with identifiers 3, 5 and 6 could be defined as −1, −2 and −4, which typically can be represented by fewer bits as compared to 3, 5 and 6, in particular if variable length coding is employed for the picture identifiers.

Figures 6, 8:
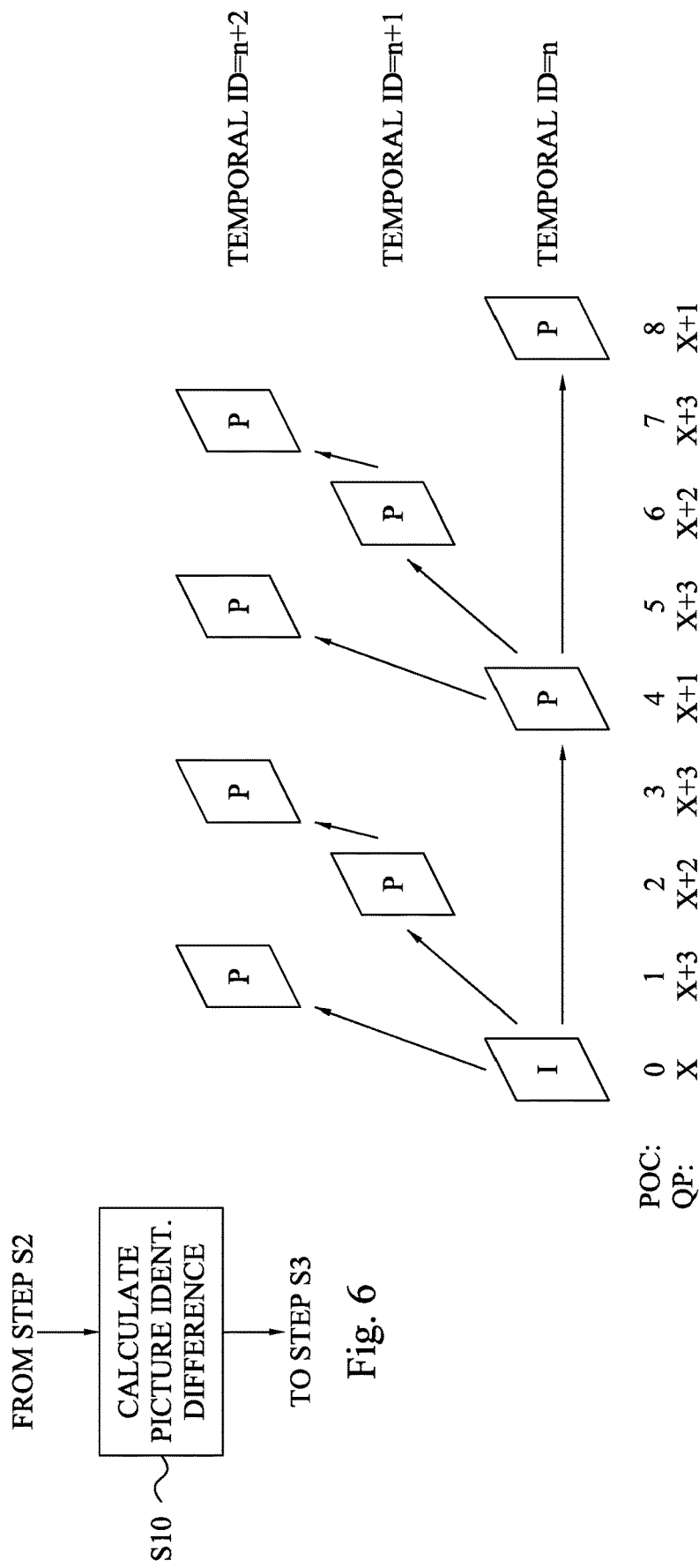
FIG. 6 is a flow chart of an additional, optional step of the method in FIG. 3.
FIG. 8 is an example of a coding structure with (sub)GOP size 8.

FIG. 6 schematically illustrates this approach. The method continues from step S2 of FIG. 3. In a next step S10 a difference is calculated for each picture identifier provided in step S2, between the picture identifier and a picture identifier identifying the current picture. As a result of this calculation a difference or delta identifier or value is obtained. The method then continues to step S3 of FIG. 3, where the buffer description information is generated based on the calculated difference(s) or delta identifier(s).

The buffer description information could therefore in this case include the delta identifiers −1, −2 and −4 instead of 3, 5 and 6.

In an embodiment, delta display order information or deltaPOC is included in the buffer description encoded with a variable length code (VLC). In a particular embodiment deltaPOC is encoded with VLC for absolute_delta_POC_minus_one and a flag, i.e. a single bit, for deltaPOC_sign signaled only if number_of_reorder_frames>0, otherwise the sign is inferred to be negative.

In the above embodiments providing an explicit signaling of the picture identifiers, either the picture identifiers themselves or the delta identifiers, the buffer description information will in fact constitute the buffer description of the current picture. This buffer description information is then inserted in the encoded representation of the picture.

Figure 5:
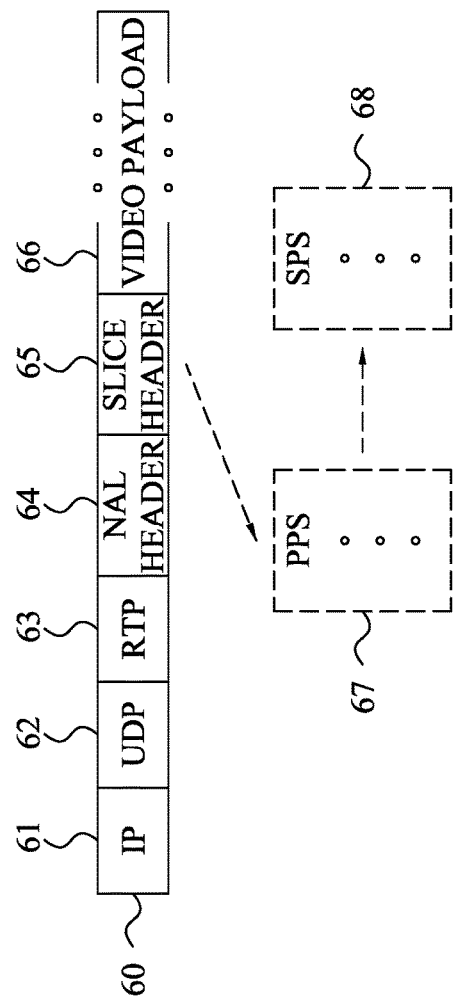
FIG. 5 is an encoded representation of a picture according to an embodiment.

The buffer description information could be included as control information at a suitable position in the encoded representation. FIG. 5 schematically illustrates an example of an encoded representation 60 of a picture. The encoded representation 60 comprises video payload data 66 that represents the encoded pixel data of the pixel blocks in a slice. The encoded representation 60 also comprises a slice header 65 carrying control information. The slice header 65 forms together with the video payload and a Network Abstraction Layer (NAL) header 64 a NAL unit that is the entity that is output from an encoder. To this NAL unit additional headers, such as Real-time Transport Protocol (RTP) header 63, User Datagram Protocol (UDP) header 62 and Internet Protocol (IP) header 61, can be added to form a data packet that can be transmitted from the encoder to the decoder. This form of packetization of NAL units merely constitute an example in connection with video transport. Other approaches of handling NAL units, such as file format, MPEG-2 transport streams, MPEG-2 program streams, etc. are possible.

The buffer description information could then be included in the slice header 65, another picture header or another data structure specified by the standard to which the encoder and decoder conforms.

In another embodiment the buffer description information inserted in the encoded representation 60 of the picture does not necessarily have to be the same as the buffer description of the current picture but rather enables identification and retrieval of the buffer description. Thus, in this embodiment the buffer description information inserted in the encoded representation 60 of the picture indirectly defines the at least one reference picture determined in step S1 by pointing towards the buffer description which carries the picture identifiers or the data, such as delta identifiers, enabling calculation of the picture identifiers.

In such a case, the buffer description could be carried by a data structure associated to the encoded representation 60 of the picture. Examples of such data structures include a Picture Parameter Set (PPS) 67 and a Sequence Parameter Set (SPS) 68. The PPS 67 and/or the SPS 68 could be directly included in the encoded representation 60 but is typically associated thereto through the inclusion of a PPS identifier and/or SPS identifier in the encoded representation 60. For instance, each slice header 65 could include a PPS identifier notifying which PPS 67 to apply for the current picture. The relevant PPS 67 may in turn include an SPS identifier notifying which SPS 68 to apply for the PPS 67 and therefore for the current picture.

The buffer description could then be inserted in the PPS 67 or the SPS 68 assigned to the current picture. In such a case, the PPS identifier or SPS identifier that is inserted in the encoded representation 60 constitutes the buffer description information that is inserted in the encoded representation 60. This PPS identifier or SPS identifier enables retrieval of the buffer description that defines the picture identifiers of the reference pictures and the PPS identifier or SPS identifier therefore indirectly defines the picture identifiers.

PPS 67 and SPS 68 merely constitutes examples of data structures associated to encoded representations 60 of pictures and which can be used to carry buffer description information according to the embodiments.

Figure 7:
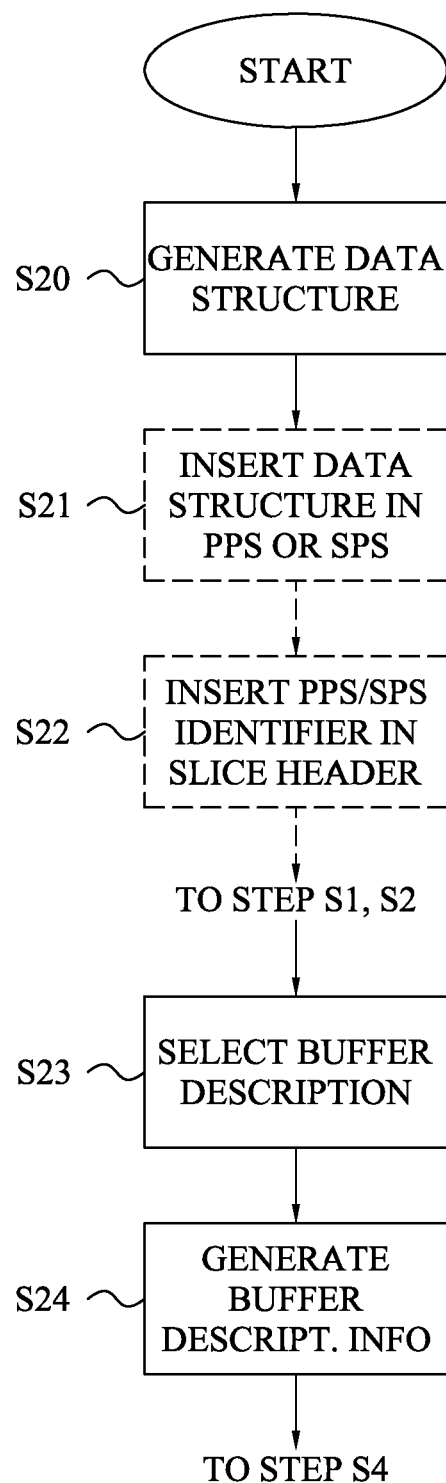
FIG. 7 is a flow chart of additional, optional steps of the method in FIG. 3 and an embodiment of generating buffer description information in FIG. 3.

FIG. 7 illustrates an alternative embodiment where one or more buffer descriptions are signaled in a data structure so that the same buffer description can be used for multiple pictures.

The method starts in step S20 where a data structure, such as a table, is generated. The data structure comprises multiple predefined buffer descriptions each defining at least one reference picture.

Each buffer description of the generated data structure could define the picture identifiers directly, i.e. include a list of picture identifiers. However, such an approach generally requires quite a few predefined buffer description in the data structure. A more efficient approach is to combine the usage of multiple predefined buffer descriptions with signaling of delta identifiers as discussed in the foregoing. In such a case, each predefined buffer description comprises at least one respective delta identifier, which is used at the decoder together with the picture identifier of the current picture to calculate the picture identifier(s) of a predefined buffer description.

Table 1 below illustrates an example of such a data structure with delta identifiers that can be used for a video stream as illustrated in FIG. 8. The video stream of FIG. 8 starts with an IDR picture, which is an Intra (I) frame that removes all dependencies to data transmitted prior to the IDR picture, i.e. it marks all reference pictures as "unused for reference". The IDR picture does not need a buffer description since it empties the decoded picture buffer. The video stream of FIG. 8 is in the form of layered video providing pictures in different temporal layers, identified by temporal identifiers (temporal_id) n, n+1 and n+2 in FIG. 8.

TABLE 1 data structure with predefined buffer descriptions

| Entry | Picture buffer 1 | Picture buffer 2 | Picture buffer 3 | Picture buffer 4 |
| --- | --- | --- | --- | --- |
| 0 | dP: −1 tId: 2 | dP: −2 tId: 1 | dP: −4 tId: 0 | dP: −8 tId: 0 |
| 1 | dP: −1 tId: 0 | dP: −2 tId: 2 | dP: −5 tId: 0 | dP: −9 tId: 0 |
| 2 | dP: −1 tId: 2 | dP: −2 tId: 0 | dP: −6 tId: 0 | dP: −10 tId: 0 |
| 3 | dP: −1 tId: 1 | dP: −2 tId: 2 | dP: −3 tId: 0 | dP: −7 tId: 0 |

Table 1 shows an example of a buffer description table where deltaPOC (dP) and temporal_id (tId) are indicated. The table is constructed using the scheme of including the two closest reference pictures (POC(current)−1 and POC(current)−2) and the two from the lowest temporal layer in the range from POC(current)−3 to POC(current)−10.

An example use of this table by the encoder is to, for a picture with POC=n, signal table entry (n %4), i.e. n modulo 4, to the decoder. In this example, the decoded picture buffer consists of four pictures (picture buffer 1 to picture buffer 4). Which pictures depends on the POC of the current picture and what entry is used. For example if picture with POC=7 uses entry 3 the reference pictures in the decoded picture buffer will consist of pictures with POC {6, 5, 4, 0}.

The data structure generated in step S20 is signaled from the encoder to the decoder. This signaling can be performed according to various embodiments. The data structure could be carried in the PPS, the SPS, a novel parameter set or in another data structure specified by the standard to which the encoder and decoder conforms. This is schematically illustrated by step S21 where the data structure is inserted in a PPS or a SPS associated with an encoded representation of the video stream. In such a case, step S22 preferably inserts a PPS identifier or SPS identifier in the encoded representation of the picture, such in a slice header. This PPS identifier or SPS identifier then enables identification of the data structure that is available when decoding the current picture.

The method continues to steps S1 and S2 of FIG. 7 where reference pictures are determined and picture identifiers are provided for the current picture. A next step S23 selects, based on the at least one picture identifier provided in step S2, a buffer description from the data structure generated in step S20.

Once such a buffer description, such as an entry in Table 1, has been selected step S24 generates buffer description information comprising an identifier, such as entry number, of the selected buffer description. The method continues to step S4 where the buffer description information is inserted in the encoded representation of the picture.

Thus, in order to specify which buffer description to use for the current picture an identifier can be signaled for the current picture. An example of such an identifier is a non-negative integer signaled in the slice header(s) of the current picture representing the number of the buffer description in the order in which the buffer descriptions are signaled.

In a typical implementation step S20 is performed once for the video stream or once for a set of multiple pictures of the video stream. This means that a single such data structure is then generated for the video stream or for the set of multiple pictures. The following steps S21 to S24 of FIG. 7 are preferably performed for each picture in the video stream or the set of multiple pictures.

Thus, the data structure, such as table, may be created in the encoder and transmitted to the decoder. In the control information of the encoded bitstream the entry number to be used is provided. By using such a table the decoder can obtain absolute information of which pictures to be used as reference pictures by detecting the entry number in the decoded bitstream and using that entry number to look up the entry in the table. The entry is then used to determine which pictures to be stored in the decoded picture buffer.

Introducing buffer description entries in, for instance, the SPS reduces the bit overhead of signaling the buffer descriptions explicitly in the slice header. These buffer descriptions can be used for multiple slices/pictures in the same sequence, i.e. video stream, and thus reduce the number of bits required per picture.

For each buffer description entry in the PPS the delta_POC and temporal_id of all reference pictures could be present in an embodiment. The optional additional_picture_id is preferably inferred to be 0 for pictures described by an entry in the PPS.

According to a further embodiment, explicit signaling of buffer description and reference signaling to an entry in a general data structure with multiple predefined buffer descriptions, such as an entry in the table above, can be combined. In such a case, these can be combined by the decoder to form a final buffer description for the current picture. One way to combine the explicit signaling and the reference signaling is to join the set of reference pictures described by explicit signaling with the set of reference pictures described by the reference signaling to form a joint set of reference pictures.

In such a case, step S3 of FIG. 3 preferably comprises generating the buffer description information to comprise the identifier of the buffer description selected in step S23 and to comprise information defining at least one reference picture. This information defining at least one reference picture could be the picture identifier of the reference picture itself or a delta identifier from which the picture identifier can be calculated.

A picture that is used for reference for a long period of time (long term reference picture) is preferably indicted by explicit description in the slice headers of the pictures for which it is available for reference. The reason is that it would be inconvenient to include every distance in POC numbers in the predefined buffer descriptions signaled in the PPS or SPS.

In a particular embodiment, the encoded representation of the picture preferably comprises a flag to indicate whether explicit signaling of the buffer description information and/or implicit signaling of the buffer description information has been selected for the current picture. This flag could, for instance, be included in the slice header of the encoded representation of the picture or in some other control information field.

In a particular embodiment, a picture 10 can be composed of one or multiple slices 20, 22 as shown in FIG. 4. In such a case, a slice 20, 22 is an independently decodable portion of the picture 10. In other words, an encoded slice can be decoded even if the data of another encoded slice of the same picture 10 is lost.

In such an approach step S1 of FIG. 3 preferably determines at least one reference picture of the video stream for each slice in the picture. It could then be possible that a first slice will use a first set of one or more reference pictures and a second slice will use a second set of one or more reference pictures. The second set could be equal to the first set or be different from the first set. It is also possible that at least one of the reference pictures is common for the first set and the second set.

Step S2 preferably determines the picture identifiers for all reference pictures determined in step S1 for at least one slice, preferably for all of the slices, in the picture. The buffer description information is then generated in step S3 based on these picture identifiers and thereby defines the reference pictures. In an embodiment, the buffer description generated in step S3 is inserted in a respective slice header of the encoded representation of the picture for each slice. Thus, each slice header of the encoded representation of the picture preferably carries a respective instance of the buffer description information. More preferably, the buffer description information carried in the slice header of a first slice of the picture is the equal to the buffer description information carried in the slice header of a second slice of the picture.

Video encoding and decoding can also be applied to so-called scalable or layered video. For instance, temporal scalability is supported in H.264/MPEG-4 AVC and Scalable Video Coding (SVC) through the definition of subsequences and usage of temporal_id in SVC and insertion of "non-existing" frames. However, in order to support temporal scalability, the pictures in the higher temporal layers are restricted when it comes to usage of MMCO. The encoder is responsive of making sure that the MMCOs in one temporal layer does not affect pictures of lower temporal layers differently compared to if the temporal layer is dropped and "non-existing" pictures are inserted and sliding window process is applied.

Figure 2:
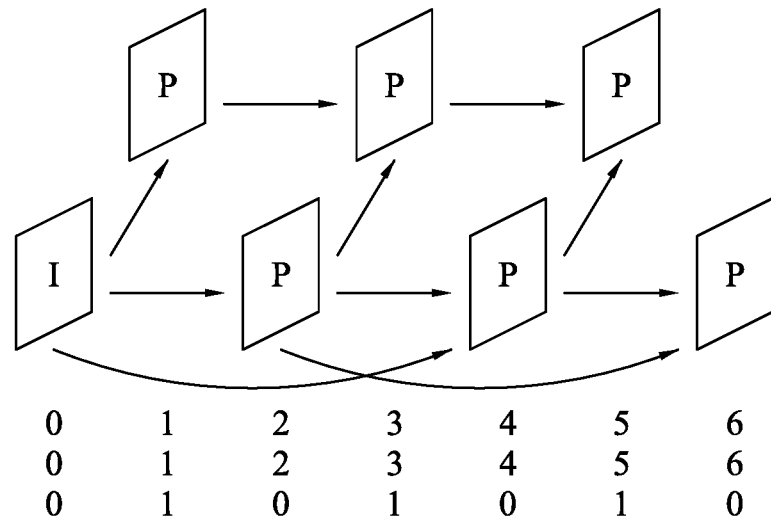
FIG. 2 is an example of a coding structure with two temporal layers.

This imposes restrictions on the encoder in selection of coding structure and reference picture usage. For instance, consider the example in FIG. 2. Assume that the maximum number of reference frames in the decoded picture buffer (max_num_ref_frames) is three even though each picture only uses two reference pictures for inter prediction. The reason is that each picture must hold one extra picture from the other temporal layer that will be used for inter prediction by the next picture.

In order to have picture POC=0 and picture POC=2 available when decoding picture POC=4, picture POC=3 must have an explicit reference picture marking command (MMCO) marking picture 1 as unavailable.

However, if temporal layer 1 is removed (for example by a network node) there will be gaps in frame_num for all odd numbered pictures. "Non-existing" pictures will be created for these pictures and sliding window process will be applied. That will result in having the "non-existing" picture POC=3 marking picture POC=0 as unavailable. Thus, it will not be available for prediction when picture POC=4 is decoded. Since the encoder cannot make the decoding process be the same for the two cases; when all pictures are decoded and when only the lowest layer is decoded; the coding structure example in FIG. 2 cannot be used for temporal scalability according to prior art.

Thus, prior art solutions have problems with temporal scalability for certain coding structures since the information about the reference pictures for the current picture is affected by the removal of a previous picture from the bitstream as the reference picture information is signaled in a relative way. Using the embodiments, temporal scalability will not be restricted as in the prior since the reference picture for the current picture is not affected by removal of previous pictures from the bitstream since it is signaled in an absolute way.

In the case of a scalable video stream with the pictures grouped into multiple layers step S2 of FIG. 3 preferably comprises providing picture identifier and temporal layer information identifying a layer of the multiple layers to which the reference picture belongs. The buffer description information is then generated in step S3 based on the at least one picture identifier and the temporal layer information. This means that the buffer description information thereby defines the at least one picture identifier and the temporal layer information.

For instance, temporal layer information, such as temporal_id, is included for each picture in the buffer description signaled using ceil(log 2(max_temporal_layers_minus1)) bits for signaling of the temporal_id. Temporal scalability is merely an example of multi-layer video to which the embodiments can be applied. Other types include multi-layer video where each picture has a picture identifier and a view identifier. Further examples of scalability include spatial scalability, signal-to-noise ratio (SNR) scalability, bit-depth scalability and chroma format scalability.

The embodiments imply that temporal down-switching is always possible. Each temporal layer together with the lower layers will constitute a sub-sequence. Such sub-sequences need no explicit signaling.

Generally, the encoder is free to select which pictures to include in the buffer description and may base its selection on any aspect, such as the closest pictures in display order. Typically, an encoder selects the buffer description to try to achieve maximum compression while complying to a set of side constraints. One example of such a constraint is a maximum number of reference pictures due to memory size. Another example is that the video stream shall be decodable also when certain coded pictures in the bitstream are removed from the bitstream before decoding. A further example is that only pictures that are available for reference in the decoded picture buffer can be selected as reference pictures.

Thus, in an embodiment step S1 of FIG. 3 comprises determining the at least one reference picture for the current picture by maximizing compression efficiency of the encoded representation of the picture while complying to at least one side constraint. The at least one side constraint is then preferably selected from a predefined maximum number of reference pictures and generating a decodable encoded representation of the video stream also when at least one encoded representation of a picture is removed from the encoded representation of the video stream.

According to another aspect of the embodiments a method is provided in which an encoded video or data stream is received, buffer description information is detected in the encoded video stream and absolute reference to pictures to be used as reference pictures for decoding a current picture or as reference pictures for future decoding is determined based on the buffer description information. The pictures to be used as reference pictures are stored in a decoded picture buffer.

FIG. 9 is a flow chart of a method of decoding an encoded representation of a picture according to an embodiment. The method starts in step S30 where buffer description information defining at least one reference picture is retrieved from the encoded representation of the picture. The buffer description information is used in step S31 to determine at least one picture identifier that, preferably unambiguously, identifies a respective reference picture as decoding reference for the picture. The at least one reference picture identifier determined in step S31 is used in step S32 to update a decoded picture buffer.

Once the decoded picture buffer has been updated to comprise the correct reference pictures needed for decoding the picture the method typically continues to step S33 where the picture is decoded based on the encoded representation of the picture and at least one of the reference pictures comprised, present or stored in the decoded picture buffer and identified based on the buffer description information.

In a preferred embodiment, the decoding step S33 is performed after updating the decoded picture buffer as indicated in FIG. 9.

The updating of the decoded picture buffer in step S32 preferably implies that the reference picture identified by the determined picture identifier is marked as "used for reference" or marked as "used for prediction" to indicate that this reference pictures is to be used as decoding reference or prediction for the current picture and/or any subsequent picture. In a particular embodiment, reference pictures could be marked as used for short-term reference or as used for long-term reference.

In a particular embodiment step S30 retrieves the buffer description information defining multiple reference pictures from the encoded representation of the picture. In such an embodiment, step S31 could determine, based on the buffer description information, i) at least one picture identifier identifying a respective reference picture as decoding reference for the picture and ii) at least one picture identifier identifying a respective reference picture as decoding reference for a subsequent, according to a decoding order, picture of the video stream. In alternative embodiments, the buffer description information identifies one or more picture identifiers of respective reference picture(s) as decoding reference for the current picture and/or one or more picture identifiers of respective reference picture(s) as decoding reference for a subsequent, according to the decoding order, picture of the video stream.

Step S32 preferably updates the decoded picture buffer to comprise the respective reference picture identified by the at least one picture identifier determined in step S31.

As previously discussed herein, the buffer description information can be provided in a slice header or another control information field of the encoded representation of the picture. In such a case, step S30 of FIG. 9 comprises retrieving the buffer description information from a slice header of the encoded representation of the picture. A multi-slice picture generally comprises multiple slice headers. In such a case each slice header preferably comprises the same buffer description information. It is then sufficient in step S30 to retrieve the buffer description information from the first slice header of the picture as any remaining slice headers of the picture will include the same buffer description information. The buffer description information in the other slice headers can then be used for error resilience if the first slice is lost.

The buffer description information could explicitly include the picture identifier(s) of the reference picture(s). In such a case, step S30 simply retrieves the at least one picture identifier from the buffer description information.

In an alternative embodiment, the buffer description information comprises delta values or delta identifiers. FIG. 10 is a flow chart illustrating an embodiment of step S31 in FIG. 9 for such a case. The method then continues from step S30 of FIG. 9. A next step S40 retrieves a respective delta identifier based on the buffer description information. The delta identifier(s) is(are) used in step S41 together with a picture identifier of the current picture to calculate the picture identifier(s) of the reference picture(s). The method then continues to step S32 of FIG. 10.

Thus, in this embodiment information available for the current picture is used by the decoder to construct the final buffer description for the current picture from the signaled buffer description information. Such information includes, but is not limited to, current POC (POC(curr)), which together with a signaled deltaPOC can be used to calculate the POC of the reference picture (POC(ref)) as POC(ref)= POC(curr)+deltaPOC.

Another embodiment relates to using multiple predefined buffer descriptions. FIG. 11 schematically illustrates such an approach. In a first step S50 a data structure comprising multiple predefined buffer descriptions is retrieved. In a preferred embodiment, the data structure is retrieved based on information carried in the encoded representation of the picture. For instance, the data structure can be signaled from the encoder side to the decoder side as a part of the PPS or the SPS of the encoded representation of the picture. In such a case, the data structure is retrieved from the PPS or the SPS in step S50 based on a PPS identifier or SPS identifier used as part of the buffer description information in the encoded representation of the picture, such as in the slice header. Alternatively, a PPS identifier is retrieved from the slice header and the PPS in turn comprises an SPS identifier that can be used if the data structure is signaled as part of the SPS.

A next step SM retrieves an identifier of a buffer description as part of the buffer description information from the encoded representation of the picture, such as from the slice header. This identifier is employed in order to identify which predefined buffer description from the data structure retrieved in step S50 to use for the current picture in step S52. The method then continues to step S31 of FIG. 1, where picture identifiers are determined from the identified predefined buffer description.

Using the embodiments it is possible to apply the optimal buffer scheme for any coding structure with very little overhead. What is needed in the slice header is simply a reference to the correct buffer description in the PPS or similar. Note that the buffer description can also be put in a picture header or similar, or a parameter set shared between all slices in a picture. The important property is that the buffer description to be used to decode a specific picture is sent with the picture and not with the previous picture in decoding order as in the prior art. In addition, the buffer description information is used to signal all reference pictures in the decoded picture buffer that should be kept for decoding each respective picture in the video stream instead of signaling delta information that can cause long-term mismatches between the encoder side and the decoding side when a single data packet is unintentionally lost.

As previously disclosed herein, the explicit signaling of buffer description in the encoded representation of a picture and reference signaling to predefined buffer description in a data structure can be combined. One way to combine the explicit signaling and the reference signaling is to join the set of reference pictures described by explicit signaling with the set of reference pictures described by reference signaling to form a joint set of reference pictures. Then one or more reference pictures included in the set of reference pictures described by reference signaling but not included in the explicit signaling are possibly removed from the joint set of reference pictures in order to have a final buffer description with no more than a maximum number (max_num_ref_frames) of reference pictures. Preferably pictures are removed in the order that they are listed in the general buffer description, i.e. the predefined buffer description, starting with the last one going forward.

Figure 12:
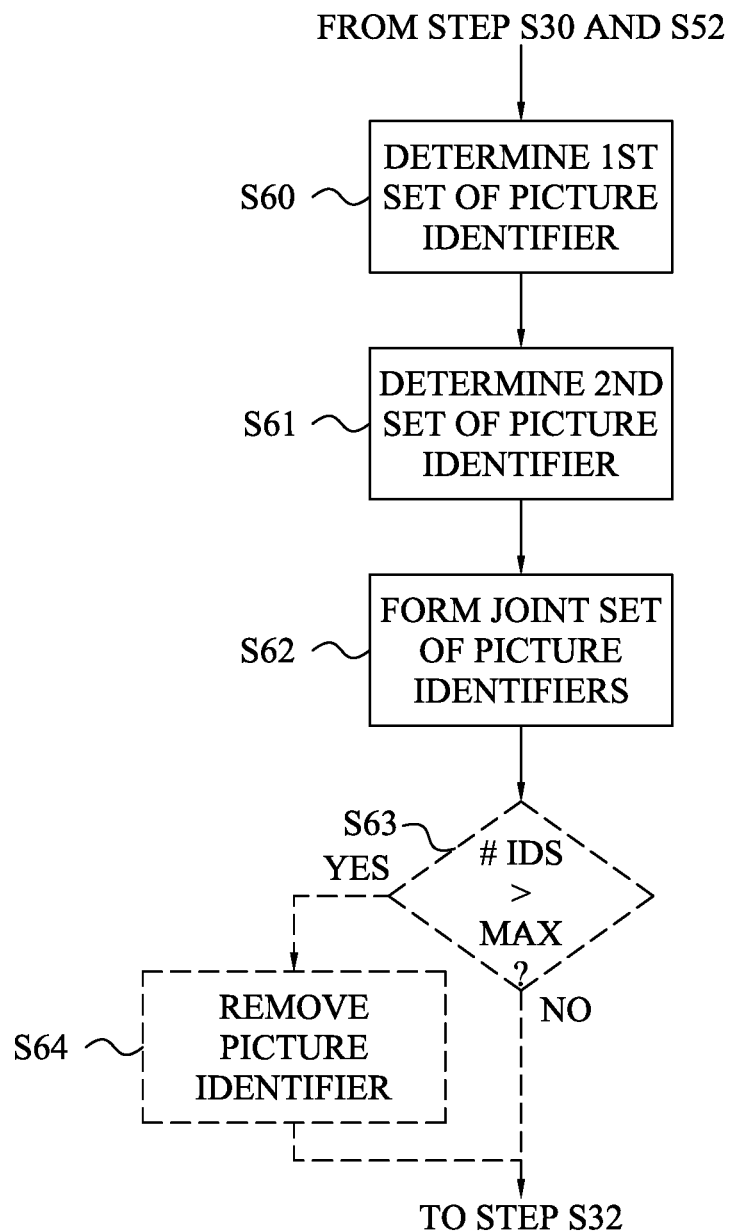
FIG. 12 is a flow chart of another embodiment of determining picture identifier in FIG. 9.

FIG. 12 is a flow chart illustrating such an approach. The method continues from step S30 in FIG. 9 and step S52 in FIG. 11. Hence, in this embodiment the buffer description information comprises both the identifier of the buffer description retrieved in step S51 of FIG. 11 and information defining at least one reference picture retrieved in step S30 of FIG. 9. This information retrieved in step S30 could be the actual picture identifier(s) or the previously mentioned delta identifier(s).

A next step S60 determines a first set of at least one picture identifier identifying a respective reference picture from the predefined buffer description identified in step S52 in FIG. 11. Correspondingly, a second set of at least one picture identifier identifying a respective reference picture is determined in step S61 from the information retrieved in step S30 of FIG. 9. Steps S60 and S61 could be performed sequentially in any order or at least partly in parallel.

The following step S62 forms a joint set of picture identifiers based on the first set determined in step S60 and the second set determined in step S61.

An optional but preferred following step S63 compares the total number of picture identifiers (IDS) in the joint set with a maximum number of reference pictures (MAX), i.e. the parameter max_num_ref_frames typically signaled in the SPS. If the total number of picture identifiers in the joint set exceeds the maximum number of reference pictures that can be stored in the decoded picture buffer the method continues to step S64. This step S64 removes one or more picture identifiers included in the first set but not in the second set until the total number of picture identifiers in the joint set no longer exceeds the maximum number of reference pictures. Thus, the joint set is thereby updated by removing picture identifiers determined in step S60. The picture identifiers are preferably removed in the order that they are listed in the predefined buffer description identified in step S52 of FIG. 11 starting from the last picture identifier and going forward.

In a particular embodiment, the encoded representation of the picture preferably comprises a flag to indicate whether explicit signaling of the buffer description information and/or implicit signaling of the buffer description information has been selected for the current picture. In such a case, the decoder retrieves the flag from the encoded representation of the picture, such as from the slice header or from some other control information field, in order to determine which type of signaling of the buffer description information that has been used for the current picture.

FIG. 13 is a flow chart illustrating additional steps of the method in FIG. 9, whereby the decoded picture buffer updated in step S32 is used for decoding purposes.

Once the decoded picture buffer has been updated in step S32 pictures may be available in the decoded picture buffer but are not included in the buffer description. Hence, in an embodiment, pictures that are available in the decoded picture buffer but not included in the buffer description are removed by the decoder from the decoded picture buffer or marked as "unused for reference" or "unused for prediction". Thus, in this embodiment removing reference pictures from the decoded picture buffer or marking of pictures as "unused for reference" is performed by the decoder prior to the picture decoding process of the picture containing the buffer description.

Step S70 illustrates this procedure by removing, from the decoded picture buffer, any reference picture stored in the decoded picture buffer and not being associated with any of the at least one picture identifier determined from the buffer description information. In an alternative embodiment of this step S70 the reference picture(s) is(are) not necessarily removed from the decoded picture buffer. This embodiment of step S70 marks any reference picture stored in the decoded picture buffer and not being associated with any of the at least one picture identifier determined from the buffer description information as unused for reference or unused for prediction. This means that the marked reference picture will not be used as prediction basis for the current picture or for any subsequent picture in the video stream. The decoder can therefore output the marked reference picture if there is a need to get an available position in the decoded picture buffer. In a particular embodiment, a picture marked as unused for reference cannot be included in the buffer description and be re-marked as used for reference.

In a particular embodiment, any reference picture present in the decoded picture buffer and associated with any of the picture identifiers determined based on the buffer description information is preferably marked in step S70 as used for reference. In an embodiment, a reference picture could be marked as either used for short-term reference or used for long-term reference. The selection between these two particular alternatives is preferably performed based on the buffer description information.

Step S71 illustrates an additional optional embodiment. This embodiment outputs zero or more of the pictures that are marked as unused for reference by the decoder according to the buffer description for display by the decoder. One such example process for output is the bumping process from H.264/MPEG-4 AVC. Output refers herein to output for display. What pictures to use as reference pictures and what pictures to output, i.e. display, is separated in H.264 and HEVC. This means that a picture can be output before it is removed as reference picture, i.e. marked as unused for reference, or it can be removed as reference frame by marking it as unused for reference before it is output.

During the decoding process, it may happen that the buffer description contains information about pictures (also referred to as frames) that are not available and therefore can not be used for reference pictures. In an embodiment, a number of "non-existing" pictures is generated by the decoder if the buffer description contains information about pictures that are not available in the decoded picture buffer. Each such picture can be given values to variables holding information that is used by the decoder in the decoding process even if the picture is not used for inter prediction or motion vector prediction. Such information could include, but is not limited to, decoding order number, display order number, temporal layer information, view information, i.e. parameters such as frame_num, POC, temporal_id and view_id.

In an embodiment, the generation of non-existing pictures is performed by the decoder prior to the picture decoding process of the picture containing the buffer description information.

Steps S72 and S73 illustrate such an embodiment. Step S72 compares the at least one picture identifier determined from the buffer description information with picture identifiers associated with reference pictures already stored in the decoded picture buffer. If a determined picture identifier is not found among the picture identifiers of the reference pictures stored in the decoded picture buffer the picture associated with the determined picture identifier is determined to be missing or non-existing. In an embodiment, a non-existing picture is optionally generated in step S73 and stored in the decoded picture buffer. This non-existing picture is then assigned any parameters, such as picture identifier, obtained from the buffer description information with regard to this particular picture. The method then continues to step S33 of FIG. 9 where the decoding process can be started.

Pictures that are signaled in the buffer description but do not exist in the decoded picture buffer are preferably marked as "non-existing". However since the POC and the temporal_id of such pictures are included in the buffer description, no explicit signaling of reference picture list modification is required. If the "non-existing" picture is not used for reference, the decoding process will proceed correctly without extra signaling (and without the overhead incorporated with signaling reference picture list modifications explicitly).

In an embodiment, the marking of zero or more pictures in step S70 is performed by the decoder in a first step. In a second step, zero or more pictures are output by the decoder in step S71. In a third step zero or more "non-existing" pictures are generated by the decoder in step S73.

In an alternative embodiment, the marking of zero or more pictures is performed by the decoder in a first step in step S70. Then an iterative process of outputting pictures (S71) and generating non-existing pictures (S73) is performed by the decoder for each picture described in the buffer description that is not available in the decoded picture buffer.

The embodiments are strengthened further by applying buffer operations, e.g. the picture marking process, before the picture decoding of the current picture, thus, having the explicit buffer description to apply to the current picture. This makes reference picture management even less vulnerable to errors, improves the possibilities for temporal scalability and reduces the overhead introduced by reference picture list modification signaling.

In an embodiment, the buffer description may contain information that is used by the decoder in reference picture list initialization or reference picture list modification or reference picture list combination. An example is the order in which the pictures are listed in a buffer description can be used as the initial order for one of the reference picture lists in reference picture list initialization. Hence, the buffer description information can be used when the reference picture list is created.

FIG. 14 is a flow chart illustrating such an approach. The method continues from step S32 of FIG. 9. A next step S80 performs reference picture list initialization based on the buffer description information. In a particular embodiment of step S80, the reference picture list initialization is performed based on the buffer description information by ordering reference pictures in a reference picture list according to an order that the buffer description information defines the at least one picture identifier determined in step S31 of FIG. 9.

In an embodiment, restrictions are specified for the pictures included in the buffer description. An example restriction is that a picture A with temporal_id tId(A) described in the buffer description for a picture B with temporal_id tId(B) may not be a non-existing picture if tId(A)<tId(B).

In an embodiment it is also possible to signal changes to the properties of pictures in the decoded picture buffer through buffer descriptions. An example is to change temporal layer and/or display order of pictures through signaling the new value for temporal layer and/or display order in the buffer description.

Figure 16:
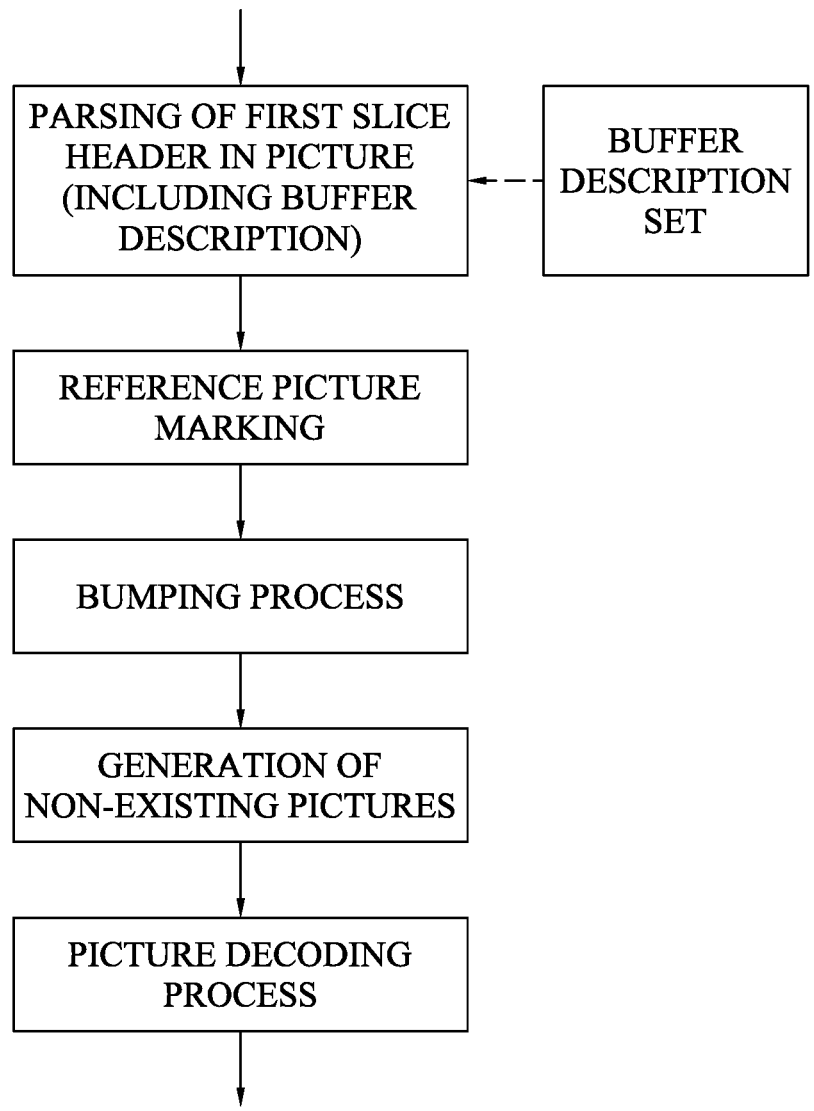
FIG. 16 is a simplified flow chart of a reference buffer scheme according to an embodiment.

FIG. 16 is a simplified flow chart of a reference buffer scheme according to an embodiment. In this scheme all decoded picture buffer operations are applied after parsing of the first slice header of a picture but before the picture decoding, using a description of the decoded picture buffer as illustrated in FIG. 16. The buffer description is, for instance, signaled in the slice header either explicitly or by reference to a predefined structure signaled in a PPS.

The embodiments thereby provide large conceptual changes to the decoding process. In traditional H.264/ MPEG-4 AVC and current design of HEVC, relative operations are given to the decoder either implicitly, i.e. sliding window, or explicitly, MMCO, and the decoder is responsible for applying these relative operations and keeping track of the reference pictures, i.e. which pictures can be used for reference. In the proposed scheme the reference pictures, i.e. which pictures can be used for reference, is signaled within the current picture, such as in the slice header, thus removing the need of implicitly and explicitly signaled relative operations.

This means that each picture will have an absolute description of the reference pictures instead of a relative description as in H.264/MEPG-4 AVC where delta information is retrieved from MMCO or from using the sliding window process.

According to a particular embodiment, the buffer description contains delta_POC, temporal_id and additional_picture_id of all reference pictures in the decoded picture buffer in order to provide an absolute reference to the pictures to be used as reference pictures. The delta_POC is used to calculate the POC of a reference picture as POC(ref)=POC (current)+delta_POC. Pictures will, in an embodiment, be identified by the pair POC and additional_picture_id. Temporal_id is included in the buffer description to enable correct reference picture list modification in the case of lost or removed pictures, e.g. temporal scalability. The scheme is, though, not restricted to the codewords delta_POC, temporal_id and additional_picture_id. Any codeword that is associated with a picture and used in the reference picture handling can be used as picture identifier and may be included in the buffer description, either relative to the value of the current picture, e.g. POC and delta_POC, or absolute, e.g. temporal_id.

All pictures in the decoded picture buffer that are not part of the buffer description are preferably marked as unused for reference.

In H.264/MPEG-4 AVC the process that delivers pictures for output (referred to as "bumping" process in FIG. 1) is sometimes performed prior to decoding, i.e. if there was a gap in frame_num. The "bumping" process is also performed after decoding and picture marking.

In the proposed scheme of FIG. 16 the "bumping" process is applied prior to decoding. It could be argued that this imposes extra delay in the decoding process before delivery of pictures for output. However it should be noted that the first picture to display is uniquely defined already after the decoding process step as soon as the number of non-displayed pictures in decoded picture buffer is larger than or equal to num_reorder_frames. Thus, a decoder can deliver that picture for display directly after the decoding process step. Thus the delay of the proposed scheme is equal to the delay of the current HEVC scheme.

In H.264/MPEG-4 AVC the syntax element frame_num is used to identify pictures in the decoded picture buffer and to detect gaps in frame_num. If gaps_in_frame_num_allowed is equal to 1 the decoder shall insert "non-existing" frames in the decoded picture buffer in order for the sliding window process to operate correctly.

In the proposed scheme illustrated in FIG. 16 the combination of POC and additional_picture_id can be used to identify pictures in the decoded picture buffer. The proposed scheme does not need to contain a sliding window process. Therefore, it is proposed to remove the syntax elements frame_num and gaps_in_frame_num_allowed.

FIG. 15 is an example of a coding structure to which the embodiments can be applied. In the example in FIG. 15, the second picture in decoding order will include POC 0 in its buffer description while the third picture in decoding order will include POC 0 and POC 4 in its buffer description. The fourth picture in decoding order must include not only POC 0 and POC 2 in its buffer description but also POC 4 since that picture will be used for reference in the future. The fifth picture in the decoding order does not need to include POC 0 in its buffer description unless it is going to be used for reference in the future. If POC 0 is not included in the buffer description it will be made unused for reference.

In the example in FIG. 15 additional_picture_id (or additional_id) is 0 for all pictures. It is recommended to set additional_picture_id to 0 unless there are two different pictures available for reference with the same POC, due to POC wrap-around. If POC is the same for two different pictures the additional_picture_id is preferably different in order to not unconditionally replace the older picture with the newer one. Additional_picture_id can be used in order to provide all the functionalities and possibilities that are provided by long term pictures in H.264/MPEG-4 AVC. Hence, in a particular embodiment the additional_picture_id constituting a part of the picture identifier could be used to signal whether a reference picture is to be used for long-term reference or for short-term reference.

Consider an example where an encoder would like to use a picture A with POC 14 and additional_picture_id set to 0, as a "long term picture". The encoder must then make sure that the picture A is included in the buffer description in the slice header of all pictures following A for as long as the encoder wants picture A to be available for reference. If the encoder would like to encode another picture with POC 14 (due to POC wrap-around) while A is still available for reference, the encoder should select another value of additional_picture_id, for example 1, to avoid that A is replaced as a reference picture.

For pictures that will be used for reference for a short period of time (short term reference pictures) it is recommended to set additional_picture_id to 0, in order to minimize the bit overhead. For pictures that will be used for reference for a long period of time (long term pictures) it is recommended that the encoder makes sure that no two pictures with the same POC and the same additional_picture_id are available for prediction at the same time.

A further aspect of the embodiments defines an encoder configured to create buffer description information defining which pictures to be used for reference pictures, i.e. stored in a decoded picture buffer to be used for subsequent decoding. At least part of the buffer description information is inserted in the bitstream encoded by the encoder.

FIG. 18 is a schematic block diagram of an embodiment of an encoder 100. The encoder 100 is configured to encode a picture of a video stream comprising multiple pictures. The encoder 100 comprises a reference picture determiner 110 configured to determine at least one reference picture for the current picture among the multiple pictures of the video stream. The at least one reference picture is used as encoding reference for the current picture. A picture identifier provider 120 of the encoder 100 is configured to provide a respective picture identifier of each reference picture determined by the reference picture determiner 110. A picture identifier provided by the picture identifier provider 120 identifies its associated reference picture. The picture identifier(s) provided by the picture identifier provider 120 collectively constitute a buffer description for the current picture by listing picture identifier(s) of the reference picture(s) required for encoding and decoding the current picture and optionally also any previous reference picture(s) of the video stream required for encoding and decoding a subsequent picture of the video stream.

The encoder 100 also comprises a buffer description information generator 130 configured to generate information of the buffer description, i.e. the buffer description information, defining the at least one reference picture determined by the reference picture determiner 110. The buffer description information generator 130 is configured to generate this buffer description information based on the at least one picture identifier from the picture identifier provider 120.

A data inserter 140 is implemented in the encoder 100 to insert the buffer description information generated by the buffer description information generator 130 into an encoded representation of the current picture. Hence, the coded bitstream of the video stream with regard to the current picture carries the buffer description information. This means that the encoded representation of the picture will carry the buffer description information that defines the relevant information, i.e. picture identifiers, required by a decoder in order to update the decoded picture buffer for the current picture to thereby enable decoding of the encoded representation of the picture.

As has been previously discussed herein the reference picture determiner 110 is preferably configured to determine any reference picture of the video stream as encoding reference for not only the current picture but also any reference picture, preferably present in the video stream prior to the current picture in the decoding order, as encoding reference for one or more subsequent pictures according to the decoding order.

In a particular embodiment each picture can be composed of one or more slices. Each such slice may then be encoded and decoded independently of other slices of the same picture. Hence, the reference picture determiner 110 preferably determines, for at least one slice, preferably for each slice of the picture, at least one reference picture to be used for encoding and decoding the particular slice. The picture identifier provider 120 preferably provides respective picture identifiers for all reference pictures determined by the reference picture determiner 110 for the current picture, i.e. for all its slices. The buffer description information is thereby generated by the buffer description information generator 130 based on these provided picture identifiers. In a preferred embodiment, the data inserter 140 is configured to insert the buffer description information in a respective slice header of the encoded representation of the picture. In such a case, each slice header of the current picture preferably carries the same buffer description information. This enables decoding of a given slice even, though, another slice of the picture is unintentionally lost.

Also other positions among control information in the encoded representation of the picture are possible for carrying the buffer description information as previously discussed herein.

The buffer description of the embodiments could include the picture identifier(s) of the reference picture(s). Alternatively, the buffer description comprises the previously discussed delta identifier(s) that can be used together with the picture identifier of the current picture to calculate the picture identifier(s) of the reference picture(s).

In such a case the encoder 100 preferably comprises an identifier calculator 150 that is configured to calculate, for each picture identifier provided by the picture identifier provider 120, a difference between the picture identifier and the picture identifier of the current picture. This difference corresponds to the delta identifier for the reference picture. The buffer description information generator 130 is then configured to generate the buffer description information based on the at least one difference/delta identifier calculated by the identifier calculator 150. The buffer description information thereby defines the at least one picture identifier of the reference picture(s) relative to the picture identifier of the current picture.

The encoded representation of the picture could carry the picture identifiers provided by the picture identifier provider 120 or the delta identifiers calculated by the identifier calculator 150 as buffer description information, for instance in the slice headers. This provides an explicit signaling of the buffer description in the encoded representation of the picture.

In an alternative embodiment, the encoder 100 comprises a data structure generator 160 configured to generate a data structure comprising multiple predefined buffer descriptions. Each such predefined buffer description thereby defines at least one reference picture. The data structure can thereby be used for multiple pictures in the video stream for the purpose of providing the buffer description to be used during decoding for the pictures. The buffer description information generator 130 is thereby configured to select a buffer description of the data structure based on the at least one picture identifier provided by the picture identifier provider 120 for the current picture. The buffer description that correctly matches the at least reference picture identifier is thereby selected and the buffer description information generated by the buffer description information generator 130 comprises an identifier of the selected buffer description.

The data structure generated by the data structure generator 160 could then be inserted in a control information field associated with an encoded representation of the video stream, such as in a PPS or SPS. An identifier of the relevant control information, i.e. a PPS identifier or an SPS identifier (could be in the form of a PPS identifier to a PPS that in turn comprises an SPS identifier to the relevant SPS), is preferably included in control information of the encoded representation of the current picture, such as in the slice header. In an embodiment, the slice header or other control information field thereby carries the control information identifier and the identifier of the selected buffer description as the buffer description information.

The above description embodiments of explicit signaling of picture identifiers and reference signaling of picture identifiers can be combined. In such a case, the buffer description information generator 130 is configured to generate the buffer description information comprising the identifier of the selected buffer description, preferably also the control information identifier, and comprising information, such as delta identifier or explicit picture identifier, defining a picture identifier of a reference picture.

The encoder 100 could use any of the previously discussed examples of picture identifiers, such as POC value that unambiguously identifiers a reference picture, or a POC value and an additional identifier.

The video stream could be a scalable video stream where the pictures are grouped into multiple layers. In such a case the picture identifier provider 120 is configured to provide, for each reference picture, the picture identifier and temporal layer information or identifier identifying a layer to which the reference picture belongs. The buffer description information generator 130 then generates the buffer description information based on the at least one picture identifier and based on the temporal layer information. Thus, the buffer description information preferably defines the at least one picture identifier and the temporal layer information.

The reference picture determiner 110 is preferably configured to determine the at least one reference picture as encoding reference for inter prediction and/or motion vector prediction for the current picture. The at least one reference picture can thereby be determined by maximizing the compression or coding efficiency of the encoded representation of the picture, i.e. minimizing the number of symbols, such as bits, required for representing the encoded representation. This compression maximization is preferably performed while complying with at least one side constraint selected from having a predefined maximum number of reference pictures and generating a decodable representation of the video stream also when at least one encoded representation of a picture is removed from the encoded representation of the video stream. A further alternative or additional side constraint is that a selected reference picture must be available for reference and prediction in the decoded picture buffer.

The encoder could be implemented at least partly in software. In such an embodiment as shown in FIG. 19, the encoder 300 comprises an input section 310 configured to receive multiple pictures of a video stream. The encoder 300 also comprises a processor 330 configured to process code means of a computer program stored in a memory 340. The code means causes, when run on the processor 330, the processor 330 to determine, for a picture of the video stream, at least one reference picture of the video stream as encoding reference for the picture. The processor 330 is also caused to provide, for each reference picture, a picture identifier identifying the reference picture and generate, based on the at least one picture identifier, buffer description information defining the at least one reference picture. The processor 330 is further caused to insert the buffer description information in an encoded representation of the picture. The encoder 300 also comprises an output section 320 configured to output the encoded representations of the pictures.

The processor 330 could be a general purpose or specially adapted computer, processor or microprocessor, such as a central processing unit (CPU). The software includes computer program code elements or software code portions effectuating the operation of at least the reference picture determiner 110, the picture identifier provider 120, the buffer description information generator 130, and the data inserter 140 of FIG. 18.

The program may be stored in whole or part, on or in one or more suitable volatile computer readable media or data storage means, such as RAM, or one or more non-volatile computer readable media or data storage means, such as magnetic disks, CD-ROMs, DVD disks, hard discs, in ROM or flash memory. The data storage means can be a local data storage means or is remotely provided, such as in a data server. The software may thus be loaded into the operating memory of a computer or equivalent processing system for execution by a processor. The computer/processor does not have to be dedicated to only execute the above-described functions but may also execute other software tasks. A non-limiting example of program code used to define the encoder 300 include single instruction multiple data (SIMD) code.

Alternatively, the encoder can be implemented in hardware. There are numerous variants of circuitry elements that can be used and combined to achieve the functions of the units 110-160 of the encoder 100 in FIG. 18. Such variants are encompassed by the embodiments. Particular examples of hardware implementation of the encoder 100 is implementation in digital signal processor (DSP) hardware and integrated circuit technology, including both general-purpose electronic circuitry and application-specific circuitry.

According to an aspect of the embodiments a transmitter 200 as shown in FIG. 17 is provided. The transmitter 200 comprises an input section 210 configured to receive multiple pictures 10 of a video stream. The pictures 10 are forwarded to an encoder 100, such as illustrated in FIG. 18 or in FIG. 19, which is configured to encode the multiple pictures 10 to generate respective encoded representations of the multiple pictures. An output section 220 of the transmitter 200 is configured to output the respective encoded representations of the multiple pictures as a coded bitstream carrying the buffer description information of the embodiments.

An aspect of the embodiments relates to a decoder for detecting buffer description information and for determining absolute reference to pictures to be used as reference pictures for decoding based on the detected buffer description and a buffer for storing the pictures to be used as reference pictures.

Figure 21:
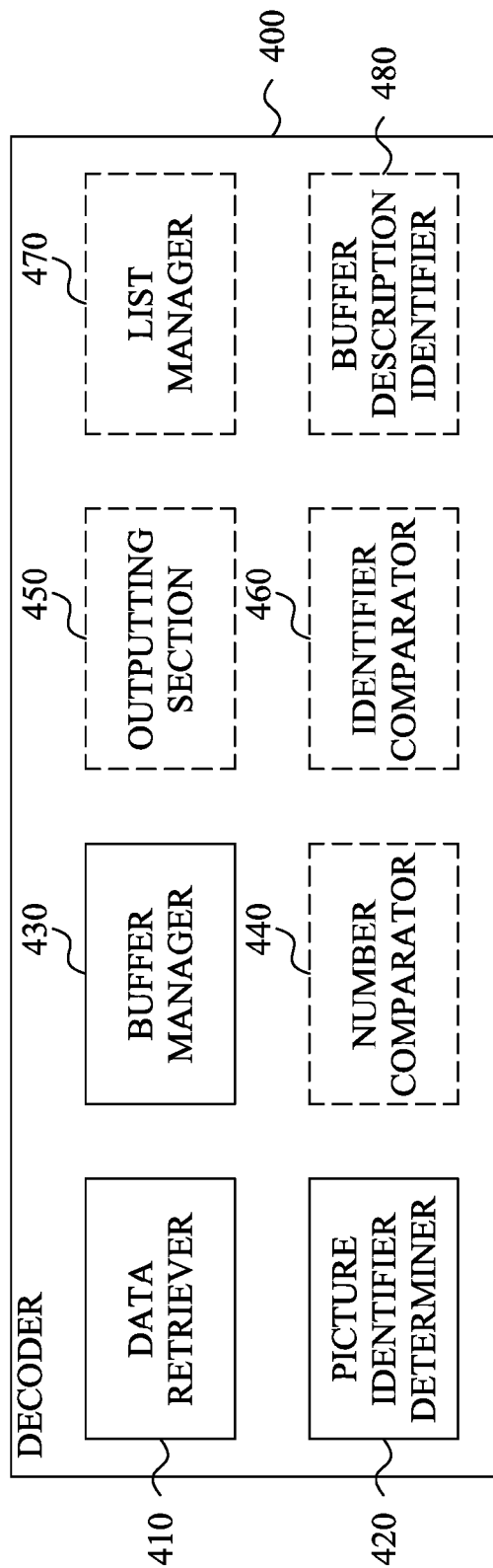
FIG. 21 is a schematic block diagram of a decoder according to an embodiment.

FIG. 21 is a schematic block diagram of a decoder 400 according to an embodiment. The decoder 400 is configured to decode an encoded representation of a picture of a video stream comprising multiple pictures. The decoder 400 comprises a data retriever 410 configured to retrieve buffer description information defining at least one reference picture from the encoded representation of the picture. The buffer description information is used by a picture identifier determiner 420 that is configured to determine at least one picture identifier identifying a respective reference picture as decoding reference for the picture. The decoder 400 also comprises a buffer manager 430 configured to update a decoded picture buffer of or associated to the decoder 400 based on the at least one picture identifier determined by the picture identifier determiner 420.

In a particular embodiment, the data retriever 410 is configured to retrieve the buffer description information defining multiple picture identifiers from the encoded representation of the picture. The picture identifier determiner 420 is then configured to determine, based on the retrieved buffer description information, at least one picture identifier identifying a respective reference picture as decoding reference for the picture and at least one picture identifier identifying a respective reference picture as decoding reference for a subsequent, according to a decoding order, picture of the video stream.

The buffer manager 430 is preferably configured to update the decoded picture buffer to comprise the respective reference picture identified by the at least one picture identifier.

Thus, the buffer description information carried by the encoded representation of the picture is used to identify which reference picture(s) that need to be stored in the decoded picture buffer for decoding the current picture and for decoding a subsequent picture of the video stream. The buffer description information thereby provides the information to the decoder 400 required to update the decoded picture buffer to store the correct reference picture(s).

Once the buffer manager 430 has updated the decoded picture buffer the decoder 400 can decode the picture based on the encoded representation of the picture and at least one reference picture stored in the updated decoded picture buffer.

The buffer description information is preferably provided in control information of the encoded representation of the picture. For instance, the data retriever 410 could be configured to retrieve the buffer description information from a slice header of the encoded representation of the picture. In such a case the buffer description information is preferably retrieved from the first slice header received for the current picture since any remaining slice headers of the picture will preferably carry the same buffer description information.

The retrieved buffer description information could include explicit picture identifiers of the reference pictures to be stored in the decoded picture buffer. In an alternative embodiment, the buffer description information defines a respective delta identifier for the reference pictures. The picture identifier determiner 420 is then configured to retrieve the at least one delta identifier from the buffer description information and calculate the at least one picture identifier based on the respective delta identifier and the picture identifier of the current picture, preferably as a sum of the delta identifier and the picture identifier of the current picture.

Instead of explicit signaling of picture identifiers or delta identifiers in the encoded representation of the picture a reference signaling can be used. The data retriever 410 is in this embodiment configured to retrieve an identifier of a buffer description from the encoded representation of the picture. The decoder 400 preferably comprises a buffer description identifier 480 configured to identify a buffer description from a data structure comprising multiple predefined buffer descriptions using the retrieved identifier of the buffer description.

The data retriever 410 is preferably in this embodiment also configured to retrieve the data structure defining the multiple predefined buffer descriptions from a control information field of or associated with an encoded representation of the video stream, such as from a PPS or SPS.

In a particular embodiment a control information field of the encoded representation of the picture, such as slice header, preferably comprises an identifier of the control information field, such as PPS or SPS, carrying the data structure. The data retriever 410 thereby retrieves this identifier and uses it to identify the relevant control information field with the data structure.

In another embodiment the buffer description information comprises the identifier of the buffer description and information, such as picture identifier or delta identifier, identifying at least one picture identifier. The picture identifier determiner 420 is then configured to determine a first set of at least one picture identifier from the identified buffer description, preferably from the data structure. The picture identifier determiner 420 also determines a second set of at least one picture identifier from the information defining at least one picture identifier, where this information has been explicitly signaled in the encoded representation of the picture, such as in the form of a picture identifier or a delta identifier. A joint set of picture identifiers is then formed from the first set and the second set by the picture identifier determiner 420.

In a particular embodiment the decoder 400 comprises a number comparator 440 configured to compare a total number of picture identifiers in the joint set with a maximum number of reference pictures that can be stored in the decoded picture buffer. If the total number of picture identifiers in the joints set exceeds the maximum number of reference pictures the picture identifier determiner 420 is configured to remove one or more picture identifiers included in the first set but not in the second set until the total number of picture identifiers in the joint set no longer exceeds the maximum number of reference pictures.

The buffer manager 430 of decoder 400 is configured, in a particular embodiment, to remove any reference picture present in the decoded picture buffer but not being associated with any of the at least one picture identifier determined from the buffer description information. Hence, any reference picture that is stored in the decoded picture buffer but not identified from the buffer description information is preferably removed from the decoded picture buffer by the buffer manager 430.

In an alternative and preferred approach, the buffer manager 430 is configured to mark all reference pictures stored in the decoded picture buffer but not being associated with any of the at least one picture identifier from the buffer description information as unused for reference, also referred to as unused for prediction.

In a particular embodiment, any reference picture present in the decoded picture buffer and associated with any of the picture identifiers determined based on the buffer description information is preferably marked by the buffer manager 430 as used for reference. In an embodiment, a reference picture could be marked as either used for short-term reference or used for long-term reference. The selection between these two particular alternatives is preferably performed based on the buffer description information.

The buffer manager 430 of the decoder 400 is preferably configured to mark any reference picture prior to the decoder 400 decoding the current picture.

In a particular embodiment, the decoder 400 comprises an outputting section 450 configured to output zero or more pictures from the decoded picture buffer for display prior to the decoder 400 decodes the current picture. In a particular embodiment, the outputting section 450 outputs any reference picture marked as unused for reference by the buffer manager 430.

An optional embodiment of the decoder 400 comprises an identifier comparator 460 configured to compare the at least one picture identifier determined by the picture identifier determiner 420 with the picture identifier(s) of reference picture(s) stored in the decoded picture buffer. If any of the at least one picture identifier defined by the buffer description information does not have a matching reference picture in the decoded picture buffer the picture associated with the given picture identifier is determined by the picture identifier determiner 420 to be non-existing or missing.

In an optional embodiment, the picture identifier determiner 420 is configured to generate any non-existing picture and store such a generate picture in the decoded picture buffer. The picture identifier and any other information obtainable from the buffer description information with regard to the non-existing picture is preferably assigned to the generated picture by the picture identifier determiner 420.

The decoder 400 may also comprise a list manager 470 configured to perform reference picture list initialization based on the buffer description information. In a particular embodiment, the list manager 470 is configured to perform the reference picture list initialization by ordering reference pictures in a reference picture list according to an order that the buffer description information defines the at least one picture identifier. Hence, the buffer description information not only defines the picture identifiers of the reference pictures but the order at which these are defined in the buffer description information also provides instructions to the list manager 470 with regard to forming the reference picture list.

Figure 22:
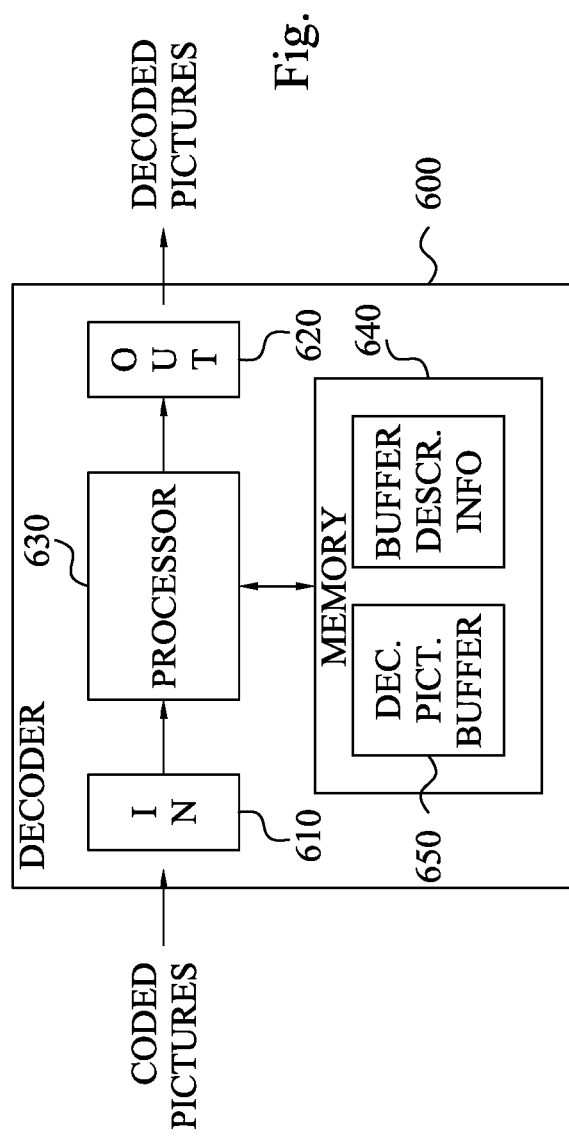
FIG. 22 is a schematic block diagram of a decoder according to another embodiment.

The decoder could be implemented at least partly in software. In such an embodiment as shown in FIG. 22, the decoder 600 comprises an input section 610 configured to receive encoded representations of multiple pictures of a video stream. The decoder 600 also comprises a processor 630 configured to process code means of a computer program stored in a memory 640. The code means causes, when run on the processor 630, the processor 630 to retrieve buffer description information defining at least one reference picture from an encoded representation of a picture. The code means also causes the processor 630 to determine at least one picture identifier identifying a respective reference picture from the buffer description information. The respective reference picture is to be used as decoding reference for the picture. The processor 630 is further caused to update a decoded picture buffer 650 based on the at least one picture identifier. The decoder 600 also comprises an output section 620 configured to output the decoded pictures of the video stream.

The processor 630 could be a general purpose or specially adapted computer, processor or microprocessor, such as a central processing unit (CPU). The software includes computer program code elements or software code portions effectuating the operation of at least data retriever 410, the picture identifier determiner 420 and the buffer manager 430 of FIG. 21.

The program may be stored in whole or part, on or in one or more suitable volatile computer readable media or data storage means, such as RAM, or one or more non-volatile computer readable media or data storage means, such as magnetic disks, CD-ROMs, DVD disks, hard discs, in ROM or flash memory. The data storage means can be a local data storage means or is remotely provided, such as in a data server. The software may thus be loaded into the operating memory of a computer or equivalent processing system for execution by a processor. The computer/processor does not have to be dedicated to only execute the above-described functions but may also execute other software tasks. A non-limiting example of program code used to define the decoder 600 include single instruction multiple data (SIMD) code.

Alternatively, the decoder can be implemented in hardware. There are numerous variants of circuitry elements that can be used and combined to achieve the functions of the units 410-480 of the decoder 400 in FIG. 21. Such variants are encompassed by the embodiments. Particular examples of hardware implementation of the decoder 400 is implementation in digital signal processor (DSP) hardware and integrated circuit technology, including both general-purpose electronic circuitry and application-specific circuitry.

According to an aspect of the embodiments a receiver 500 as shown in FIG. 20 is provided. The receiver 500 comprises an input section 510 configured to receive encoded representations of multiple pictures of a video stream. The encoded representation carries buffer description information according to the embodiments. The encoded representations are forwarded to a decoder 400, such as illustrated in FIG. 21 or in FIG. 22, which is configured to decode the encoded representations of the multiple pictures. An output section 520 of the receiver 500 is configured to output decoded pictures of the video stream. The receiver 500 also comprises a decoded picture buffer 530 storing reference pictures to be used by the decoder 400 when decoding the pictures.

Annex

The present annex presents a proposed syntax of an embodiment. In the annex added syntax element with regard to the prior art HEVC proposal is marked with underlining and removed syntax elements are marked with strike-through.

Slice Header

| | Descriptor |
|---|---|
| slice_header( ) { | |
|   first_tb_in_slice | ue(v) |
|   entropy_slice_flag | u(1) |
|   if( !entropy_slice_flag ) { | |
|     slice_type | ue(v) |
|     pic_parameter_set_id | ue(v) |
|     ~~frame_num~~ | ~~u(v)~~ |
|     <u>additional_picture_id</u> | <u>ue(v)</u> |
|     if( IdrPicFlag ) | |
|       idr_pic_id | ue(v) |
|     if( pic_order_cnt_type == 0 ) | |
|       pic_order_cnt_lsb /* | u(v) |
|     <u>if(!IdrPicFlag){</u> | |
|       <u>buffer_description_reference_flag</u> | <u>u(1)</u> |
|       <u>if(buffer_description_reference_flag == 1){</u> | |
|         <u>buffer_description_id</u> | <u>ue(v)</u> |
|       <u>}</u> | |
|       <u>if(buffer_description_reference_flag == 0){</u> | |
|         <u>number_of_explicitly_signaled_pictures</u> | <u>ue(v)</u> |
|         <u>for(number_of_explicitly_signaled_pictures) {</u> | |
|           <u>additional_picture_id</u> | <u>ue(v)</u> |
|           <u>if(num_reorder_frames > 0)</u> | |
|             <u>delta_POC_sign</u> | <u>u(1)</u> |
|           <u>absolute_delta_POC_minus_one</u> | <u>ue(v)</u> |
|           <u>temporal_id</u> | <u>u(v)</u> |
|         <u>}</u> | |
|       <u>}</u> | |
|     <u>}</u> | |
|   if( slice_type == P || slice_type == B ) { | |
|     num_ref_idx_active_override_flag | u(1) |
|     if( num_ref_idx_active_override_flag ) { | |
|       num_ref_idx_l0_active_minus1 | ue(v) |
|       if( slice_type == B ) | |
|         num_ref_idx_l1_active_minus1 | ue(v) |
|     } | |
|   } | |
|   ref_pic_list_modification( ) | |
|   ref_pic_list_combination( ) | |
|   ~~if( nal_ref_idc != 0 )~~ | |
|     ~~dec_ref_pic_marking( )~~ | |
|   if( entropy_coding_mode_flag && slice_type != I) | |
|     cabac_init_idc | ue(v) |
|   slice_qp_delta | se(v) |
|   if( adaptive_loop_filter_enabled_flag ) | |
|     alf_param( ) | |
|   if( deblocking_filter_control_present_flag ) { | |
|     disable_deblocking_filter_idc | |
|     if( disable_deblocking_filter_idc != 1 ) { | |
|       slice_alpha_c0_offset_div2 | |
|       slice_beta_offset_div2 | |
|     } | |
|   } | |
|   if( slice_type == B ) | |
|     collocated_from_l0_flag | u(1) |
| } else | |
|   if( entropy_coding_mode_flag && slice_type != I) | |
|     cabac_init_idc | ue(v) |
| } | |

Picture Parameter Set

| | Descriptor |
|---|---|
| pic_parameter_set_rbsp( ) { | |
|   pic_parameter_set_id | ue(v) |
|   seq_parameter_set_id | ue(v) |
|   entropy_coding_mode_flag | u(1) |
|   num_ref_idx_l0_default_active_minus1 | ue(v) |
|   num_ref_idx_l1_default_active_minus1 | ue(v) |
|   pic_init_qp_minus26 /* relative to 26 */ | se(v) |
|   constrained_intra_pred_flag | u(1) |
|   number_of_buffer_descriptions | ue(v) |
|   for(number_of_buffer_descriptions){ | |
|     number_of_pictures_in_buffer_description | ue(v) |
|     for(number_of_pictures_in_buffer_description) { | |
|       if(num_reorder_frames > 0) | |
|         delta_POC_sign | u(1) |
|       absolute_delta_POC_minus_one | ue(v) |
|       temporal_id | u(v) |
|   } | |
|   rbsp_trailing_bits( ) | |
| } | |

Proposed Semantics

Decoding Process for Buffer Description Application

This process is invoked at the beginning of the decoding process for each I, P, or B picture, prior to decoding of the first Coding Unit in the first slice of the picture and prior to the decoding process for reference picture list construction.

The process may result in marking one or more picture as "unused for reference".

The process may result in the construction of "non-existing" pictures as described in Creation of non-existing pictures.

A reference picture is identified for use in the decoding process by the variables POC and additional_picture_id.

A reference picture r in the decoded picture buffer is said to be a part of a buffer description if and only if POC(r)=POC(curr)+delta_POC(i) and additional_picture_id(r)=additional_picture_id(i) for any i in the range of 0 to number_pictures_in_buffer_description.

Sequence of Operation for Buffer Description Application

Buffer description application proceeds in the following ordered steps:
1. Depending on whether the current picture is an IDR picture, the following applies.
   If the current picture is an IDR picture, all reference pictures are marked as unused for reference.
   Otherwise (the current picture is not an IDR picture), the following ordered steps applies:
   I. The buffer description information in the slice header of the first slice of the current picture is used to create a list of reference pictures, referred to as the buffer description as described in Creation of a buffer description.
   II. All reference pictures (in the decoded picture buffer) that are not a part of the buffer description are marked as "unused for reference".
   III. If one or more pictures that are included in the buffer description are not available for reference (i.e. existing in the reference buffer marked as "used for reference") the process described in Creation of non-existing pictures is invoked.
2. The slices of the current picture are decoded.

Creation of a Buffer Description

If buffer_description_reference_flag is 1, a buffer description is created setting deltaPOC to the deltaPOC of the PPS buffer description entry identified by buffer_description_id, temporal_id to the temporal_id of the PPS buffer description entry identified by buffer_description_id and additional_picture_id to 0 for each picture i in the range from 0 to number_of_pictures_in_buffer_description−1.

If buffer_description_reference_flag is 0, a buffer description is created setting deltaPOC to the deltaPOC of the explicitly signaled buffer description, temporal_id to the temporal_id of the explicitly signaled buffer description and additional_picture_id to additional_picture_id of the explicitly signaled buffer description for each picture i in the range from 0 to number_of_explicitly_signaled_pictures−1.

Creation of Non-Existing Pictures

This process is preferably invoked for each picture that is included in the buffer description of the current picture but is not available in the decoded picture buffer. That is if the buffer description of the current picture contains an entry i, with a POC(i) and additional_picture_id(i) such that there is no picture j in the decoded picture buffer marked as "used for reference" with POC(j)=POC(i) and additional_picture_id(j)=additional_picture_id(i).

For each such description a "non-existing" picture is generated with POC set to POC(i), additional_picture_id set to additional_picture_id(i), temporal_id set to temporal_id (i) and marked as "non-existing" and "used for reference". The sample values of the generated frames may be set to any value. These generated frames which are marked as "non-existing" shall not be referred to in the inter prediction process.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

What is claimed is:

1. A method of encoding a picture for a video stream of multiple pictures, said method comprising:
   determining at least one reference picture to be used as an encoding reference for a current picture to be encoded;
   providing a reference picture identifier for each reference picture of the at least one reference picture;
   calculating at least one delta identifier comprising a difference between a current picture identifier of the current picture and the at least one reference picture identifier;
   generating buffer description information defining the at least one delta identifier;
   encoding, using an encoder configured to encode the current picture into the video stream, the buffer description information in an encoded representation of the current picture; and
   transmitting the video stream with the encoded representation of the current picture and the buffer description information.

2. The method of claim 1, wherein determining at least one reference picture comprises determining the at least one reference picture among multiple reference pictures.

3. The method of claim 1, wherein delta display order information is included in the buffer description information and is encoded with a variable-length code.

4. The method of claim 1, further comprising generating a data structure comprising multiple predefined buffer descriptions each defining at least one reference picture, wherein generating said buffer description information comprises:
  selecting, based on said at least one picture identifier, a buffer description of said data structure; and
  generating said buffer description information comprising an identifier of said selected buffer description.

5. The method according to claim 4, further comprising:
  inserting said data structure in a picture parameter set or a sequence parameter set associated with an encoded representation of said video stream; and
  inserting an identifier of said picture parameter set or of said sequence parameter set-in a slice header of said encoded representation of said picture as part of said buffer description information.

6. The method according to claim 4, wherein generating-said buffer description information comprises generating said buffer description information comprising said identifier of said selected buffer description and comprising information defining a reference picture of said at least one reference picture.

7. The method according to claim 1, wherein determining the at least one reference picture comprises determining, for the picture, the at least one reference picture by maximizing compression efficiency of an encoded representation of the picture while complying to at least one side constraint selected from a predefined maximum number of reference pictures and generating a decodable encoded representation of said video stream also when at least one encoded representation of a picture is removed from said encoded representation of said video stream.

8. An encoder configured to encode a representation of a picture for a video stream of multiple pictures, the encoder comprising:
  at least one processor; and
  a memory storing instructions which, when executed by the at least one processor causes the encoder to perform operations comprising:
    determining at least one reference picture to be used as an encoding reference for a current picture to be encoded;
    providing a reference picture identifier for each reference picture of the at least one reference picture;
    calculating at least one delta identifier comprising a difference between a current picture identifier of the current picture and the at least one reference picture identifier;
    generating buffer description information defining the at least one delta identifier;
    encoding, using an encoder configured to encode the current picture into the video stream, the buffer description information in an encoded representation of the current picture; and
    transmitting the video stream with the encoded representation of the current picture and the buffer description information.

9. The encoder according to claim 8, wherein determining at least one reference picture comprises determining the at least one reference picture among multiple reference pictures.

10. The encoder according to claim 8, wherein delta display order information is included in the buffer description information and is encoded with a variable-length code.

11. The encoder according to claim 8, wherein the memory stores further instructions which, when executed by the at least one processor causes the encoder to perform operations further comprising generating a data structure comprising multiple predefined buffer descriptions each defining at least one reference picture by:
  selecting, based on said at least one picture identifier, a buffer description of said data structure; and
  generating said buffer description information comprising an identifier of said selected buffer description.

12. The encoder according to claim 11, wherein the memory stores further instructions which, when executed by the at least one processor causes the encoder to perform operations further comprising:
  inserting said data structure in a picture parameter set or a sequence parameter set associated with an encoded representation of said video stream; and
  inserting an identifier of said picture parameter set or of said sequence parameter set-in a slice header of said encoded representation of said picture as part of said buffer description information.

13. The encoder according to claim 11, wherein generating-said buffer description information comprises generating said buffer description information comprising said identifier of said selected buffer description and comprising information defining a reference picture of said at least one reference picture.

14. The encoder according to claim 8, wherein determining the at least one reference picture comprises determining, for the picture, the at least one reference picture by maximizing compression efficiency of an encoded representation of the picture while complying to at least one side constraint selected from a predefined maximum number of reference pictures and generating a decodable encoded representation of said video stream also when at least one encoded representation of a picture is removed from said encoded representation of said video stream.

15. A non-transitory computer-readable medium storing program instructions for encoding a representation of a picture for a video stream of multiple pictures, the program instructions that when executed by a processor of a node in an access network cause the node to perform operations comprising:
  determining at least one reference picture to be used as an encoding reference for a current picture to be encoded;
  providing a reference picture identifier for each reference picture of the at least one reference picture;
  calculating at least one delta identifier comprising a difference between a current picture identifier of the current picture and the at least one reference picture identifier;
  generating buffer description information defining the at least one delta identifier;
  encoding, using an encoder configured to encode the current picture into the video stream, the buffer description information in an encoded representation of the current picture; and
  transmitting the video stream with the encoded representation of the current picture and the buffer description information.

16. The non-transitory computer-readable medium of claim 15, wherein determining at least one reference picture comprises determining the at least one reference picture among multiple reference pictures.

17. The non-transitory computer-readable medium of claim 15, wherein delta display order information is included in the buffer description information and is encoded with a variable-length code.

18. The non-transitory computer-readable medium of claim 15, wherein the non-transitory computer readable medium stores further program instructions that when executed by a processor of the node in the access network cause the node to perform operations further comprising generating a data structure comprising multiple predefined buffer descriptions each defining at least one reference picture, wherein generating said buffer description information comprises:

selecting, based on said at least one picture identifier, a buffer description of said data structure; and generating said buffer description information comprising an identifier of said selected buffer description.

19. The non-transitory computer-readable medium according to claim 18, wherein the non-transitory computer readable medium stores further program instructions that when executed by a processor of the node in the access network cause the node to perform operations further comprising:

inserting said data structure in a picture parameter set or a sequence parameter set associated with an encoded representation of said video stream; and inserting an identifier of said picture parameter set or of said sequence parameter set-in a slice header of said encoded representation of said picture as part of said buffer description information.

20. The non-transitory computer-readable medium according to claim 15, wherein determining the at least one reference picture comprises determining, for the picture, the at least one reference picture by maximizing compression efficiency of an encoded representation of the picture while complying to at least one side constraint selected from a predefined maximum number of reference pictures and generating a decodable encoded representation of said video stream also when at least one encoded representation of a picture is removed from said encoded representation of said video stream.

* * * * *

UNITED STATES PATENT AND TRADEMARK OFFICE
CERTIFICATE OF CORRECTION

PATENT NO. : 11,770,552 B2
APPLICATION NO. : 17/562206
DATED : September 26, 2023
INVENTOR(S) : Samuelsson et al.

It is certified that error appears in the above-identified patent and that said Letters Patent is hereby corrected as shown below:

On the Title Page

On Page 2, in Item (56), under "OTHER PUBLICATIONS", in Column 2, Line 26, delete "JCTVC-F493," and insert -- JCT-VC-F493, --, therefor.

On Page 2, in Item (56), under "OTHER PUBLICATIONS", in Column 2, Line 29, delete "JCTVC-F493" and insert -- JCT-VC-F493 --, therefor.

On Page 2, in Item (56), under "OTHER PUBLICATIONS", in Column 2, Line 38, delete "report" and insert -- Report --, therefor.

On Page 2, in Item (56), under "OTHER PUBLICATIONS", in Column 2, Line 40, delete "JCTVC-E603," and insert -- JCT-VC-E603, --, therefor.

On Page 2, in Item (56), under "OTHER PUBLICATIONS", in Column 2, Line 41, delete "JTC1/SC29/WG11," and insert -- JCT1/SC29/WG11, --, therefor.

On Page 2, in Item (56), under "OTHER PUBLICATIONS", in Column 2, Line 45, delete "JTC1/SC29/WG11," and insert -- JCT1/SC29/WG11, --, therefor.

In the Drawings

In Fig. 3, Sheet 3 of 12, for Step "S4", Line 3, delete "CODED" and insert -- ENCODED --, therefor.

In Fig. 8, Sheet 4 of 12,

Signed and Sealed this
Sixteenth Day of April, 2024

Katherine Kelly Vidal
*Director of the United States Patent and Trademark Office* delete "TEMPORAL ID=n+2 TEMPORAL ID=n+1 TEMPORAL ID=n" and insert -- TEMPORAL_ID=n+2 TEMPORAL_ID=n+1 TEMPORAL_ID=n --, therefor.

In Fig. 11, Sheet 6 of 12, for Step "S50", Line 2, delete "STRUCTURE." and insert -- STRUCTURE --, therefor.

In the Specification

In Column 1, Line 7, delete "2020," and insert -- 2020, now U.S. Pat. No. 11,265,576, --, therefor.

In Column 1, Line 22, delete "filed" and insert -- filed on --, therefor.

In Column 1, Line 38, delete "based" and insert -- based on --, therefor.

In Column 2, Line 11, delete "to previous" and insert -- to previously --, therefor.

In Column 3, Line 33, delete "Group Of" and insert -- Group of --, therefor.

In Column 3, Line 42, delete "loosing" and insert -- losing --, therefor.

In Column 3, Line 44, delete "Supplementary Enhancement Information (SEI)" and insert -- Supplemental Enhancement Information (SEI) --, therefor.

In Column 5, Line 10, delete "generate" and insert -- generating --, therefor.

In Column 5, Line 53, delete "optional steps" and insert -- optional step --, therefor.

In Column 12, in Table 1, Line 1, delete "data" and insert -- Data --, therefor.

In Column 12, Line 25, delete "(n %4)," and insert -- (n%4), --, therefor.

In Column 12, Line 42, delete "such in" and insert -- such as in --, therefor.

In Column 13, Line 8, delete "such a table" and insert -- such table --, therefor.

In Column 13, Line 45, delete "indicted" and insert -- indicated --, therefor.

In Column 14, Line 20, delete "the equal" and insert -- equal --, therefor.

CERTIFICATE OF CORRECTION (continued)
U.S. Pat. No. 11,770,552 B2

In Column 15, Line 16, delete "ceil(log 2(max_temporal_layers_minus1))" and insert -- ceil(log2(max_temporal_layers_minus1)) --, therefor.

In Column 17, Line 3, delete "step S32 of FIG. 10." and insert -- step S32 of FIG. 9. --, therefor.

In Column 17, Line 29, delete "step SM" and insert -- step S51 --, therefor.

In Column 17, Line 35, delete "step S31 of FIG. 1," and insert -- step S31 of FIG. 9, --, therefor.

In Column 18, Line 25, delete "identifiers (IDS)" and insert -- identifiers (IDs) --, therefor.

In Column 18, Line 49, delete "that has" and insert -- has --, therefor.

In Column 24, Line 30, delete "decoding for" and insert -- decoding of --, therefor.

In Column 24, Line 53, delete "above description" and insert -- above-described --, therefor.

In Column 28, Line 54, delete "generate" and insert -- generated --, therefor.